United States Patent [19]

Migues et al.

[11] Patent Number: 5,787,373
[45] Date of Patent: Jul. 28, 1998

[54] TRAVEL EXPENSE TRACKING SYSTEM

[75] Inventors: Steven P. Migues, Bedford; Arthur Dubey, Dallas, both of Tex.

[73] Assignee: Datatrac International, Inc., Hurst, Tex.

[21] Appl. No.: 876,113

[22] Filed: Jun. 13, 1997

Related U.S. Application Data

[63] Continuation of Ser. No. 745,696, Nov. 12, 1996, abandoned, which is a continuation of Ser. No. 541,319, Oct. 10, 1995, abandoned, which is a continuation of Ser. No. 570,875, Aug. 22, 1990, abandoned.

[51] Int. Cl.⁶ .................. G06F 17/40; G06F 17/60
[52] U.S. Cl. .................. 701/33; 701/35; 705/30
[58] Field of Search .................. 364/424.093, 424.034, 364/424.038, 442; 340/425.5; 395/201, 230; 701/1, 29, 33, 123, 35; 705/1, 30, 417

[56] References Cited

U.S. PATENT DOCUMENTS

| | | | |
|---|---|---|---|
| 4,192,006 | 3/1980 | Hausdorff | 364/715 |
| 4,371,934 | 2/1983 | Wahl et al. | 364/444 |
| 4,564,905 | 1/1986 | Masuda et al. | 364/442 |
| 4,608,638 | 8/1986 | Tsikos | 364/424.04 |
| 4,644,368 | 2/1987 | Mutz | 346/33 D |
| 4,817,118 | 3/1989 | Wilburn et al. | 371/26 |
| 4,852,000 | 7/1989 | Webb et al. | 364/406 |

*Primary Examiner*—Michael Zanelli
*Attorney, Agent, or Firm*—Melvin A. Hunn

[57] ABSTRACT

An expense tracking system is provided for use with the portable computer having a computer memory, a computer keyboard, and a display screen, in a vehicle of the type which generates an electrical odometer signal corresponding to the distance traveled by the vehicle. A mileage tracking hardware module is electrically coupled to the portable computer for receiving the electrical odometer signals from the vehicle, and for generating a mileage signal which is readable by the portable computer. A computer program is resident in memory of the portable computer and is operable in a mileage tracking mode for receiving data relating to the trip purpose, trip contact, and trip time, and for receiving the mileage signal from the mileage tracking hardware module and grouping data of the mileage signal with the trip purpose, trip contact, and trip time data, and for storing the group data in the memory of the portable computer.

23 Claims, 18 Drawing Sheets

```
                161     163      165      167   169      171   173   175
                 \/      \/       \/       \/    \/      \/    \/    \/
                 /\      /\       /\       /\    /\      /\    /\    /\
                /        /        /   Mileage Master Trip Log
               /        /        /              \        \     \     \
           Date     Trip Purpose  Person Seen      Start    End       Total  Start      End 03/01/90 Interview     Dr. James Baker              143043.30 143044.59   1.29  17:03:40 17:11:14
                         Comment: Left Brochures and 10 samples of Darvocet                            17:53:00
           03/01/90 Interview     Dr. Bob Brown                143044.59 143062.13  17.54  17:54:51 18:18:13
                         Comment: Left 10 samples Tears Natural                                        18:38:39
           03/02/90 Office        Alcon                        143062.13 143075.36  13.23  10:38:45 10:57:40
           03/02/90 Interview     Dr. Steve Smith              143075.36 143083.34   7.98  12:27:25 12:42:31
                         Comment: Doctor Not In      ***********                                       12:59:22
           03/04/90 Interview     Dr. Alvin Walker             143083.34 143091.10   7.76  08:36:11 08:55:19
                         Comment: Left 15 Naphcon-A  **********                                        09:55:55
           03/04/90 Lunch         Dr. David Dickens            143091.10 143093.55   2.45  12:47:51 12:52:59
           03/04/90 Interview     Dr. Bobby Wilkins            143093.55 143097.88   4.33  13:09:37 13:30:54
                         Comment: Left 10 samples Tears Natural                                        13:55:22
           03/04/90 Golf          Dr. Jim Perkins              143097.88 143109.62  11.74  15:28:00 15:55:13
           03/04/90 Office        McNeil                       143109.62 143116.69   7.07  16:00:07 16:12:00
           03/04/90 Interview     Dr. Bill Parsons             143116.69 143122.53   5.84  16:55:09 17:14:15
                         Comment: Left 20 Max Strength Sine-Aid                                        17:34:33
           03/05/90 Interview     Ion Labs Dave Brown          143122.53 143124.87   2.34  11:46:37 11:52:32
                         Comment: Lunch               ***********                                      12:01:22
           03/05/90 Lunch         Ion Labs Dave Brown          143124.87 143127.05   2.18  13:55:33 14:00:46
           03/05/90 Lunch         Ion Labs Dave Brown          143127.05 143135.40   8.35  17:36:08 17:57:49
           03/05/90 Office        Merck, Sharp and Dohme       143135.40 143141.51   6.11  18:04:32 18:15:13
           03/05/90 Interview     Dr. James Whittmore          143141.51 143147.85   6.34  22:08:38 22:20:24
                         Comment: Left 20 Cuprimine                                                    22:45:00

Total Trips             16
           Total Interviews         8
           Total Miles Driven     104.55 Miles
           Total Driving Time       2.50 Hours
           Total Interview Time     3.73 Hours
```

FIG. 3

```
Mileage Master Version 1.0      Miles = 143433.21      03/24/90      08:57:23 am TIME     CONTACT          DETAILS
08:15    Henry Ford       Sales Proposal for Automobile Tracking System
09:30    George Bash      Training for new negotiation tactics
11:30    Ley Iacoco       Lunch 13:45    Raejer Smith     Sales call for new products
15:15    Jeff Meanee      Drop off literature for new Widget
16:00    Ronnie Raygun    Memory Improvement Training Seminar Specific Appointment Calendar for 03/24/90                <ESC> To Exit
```

FIG. 11c

TRAVEL EXPENSE TRACKING SYSTEM

This is a continuation of application Ser. No. 08/745,696, filed Nov. 12, 1996 now abandoned, which is a continuation of application Ser. No. 08/541,319, filed Oct. 10, 1995, now abandoned, which is a continuation of application Ser. No. 07/570,875, filed Aug. 22, 1990, now abandoned.

BACKGROUND OF THE INVENTION

1. Field of the Invention

The present invention relates generally to expense tracking systems, and specifically to vehicle based, personal computer moderated expense tracking systems.

2. Description of the Prior Art

One burden common to all business travelers is the need to keep accurate expense records for billing and accounting purposes. This is especially true if expenses are expected to be deducted, since the Internal Revenue Service requires accurate contemporaneous record keeping on the part of the taxpayer.

A business traveler is especially burdened with record keeping if the business travel comprises a great number of short trips in a motor vehicle. It is easy to forget to keep contemporaneous and accurate mileage records for allocation to different clients and accounts.

The Internal Revenue Service requires the following information to support mileage deductions: (1) the purpose of the business travel; (2) the person(s) visited; (3) the date and time of the visit; and (4) the mileage traveled in making the visit. The recordation of this information places a burden on the traveling business person that annoys and distracts from the primary job obligation.

It is additionally burdensome for the business person to keep current records of out-of-pocket expenses incurred during travel, for assignment to particular accounts or ledgers.

The manager of traveling business persons is acutely interested in having an understanding of the daily routine of salesmen and the like. Elaborate paper-based record keeping systems are often devised to allow a manager to monitor the efforts of a sales or delivery force, and to keep track of travel and appointment times.

Several "trip" computers exist which assist vehicle drivers in tracking fuel consumption, and trip mileage. For example, U.S. Pat. No. 4,371,934, entitled "Vehicle Trip Computer," issued to Wahl et al. on Feb. 1, 1983, describes a system which interrelates speed, distance, time, and fuel consumption data on a multi-button panel with a numeric display. This system also gives and indication of the vehicle range of travel on the remaining fuel.

Likewise, the system of U.S. Pat. No. 4,564,905, entitled "Trip Computer For Vehicles," which issued on Jan. 14, 1987, to Masuda et al., discloses a vehicle "trip computer" which detects the distance traveled by the vehicle and the amount of fuel remaining in the fuel tank. This system will compute and display the capable travel distance of the vehicle in accordance with the detected data.

Other systems, such as that disclosed in U.S. Pat. No. 4,608,638, entitled "Apparatus For Accumulating and Permanently Storing Statistical Information," which issued on Aug. 26, 1986 to Tsikos, includes a means for counting a variety of trip events, and for permanently storing data relating to the trip. Essentially, the system of the Tsikos patent records the "driving history" of the motor vehicle by recording information about the number and types of trips traveled by the motor vehicle during the life of the vehicle. Types of trips are classified. For example, trips of one mile or less are differentiated from trips of other lengths. By separately counting the number of trips in each trip category, a "trip mileage histogram" may be developed during the life of the vehicle. Information relating to the running time or engine speed of the vehicle may also be recorded.

U.S. Pat. No. 4,644,368, entitled "Tachograph For Motor Vehicles," which issued on Feb. 17, 1987 to Mutz, discloses an apparatus for recording vehicle data, such as the time of day, the date, the driver's service hours, the driver's driving time, the driver's standby times, and the driver's rest times, the distance driven, and the speed driven. The system includes a means for printing the content of a memory card on paper.

U.S. Pat. No. 4,817,118, entitled "Mobile Incident Logger," which issued on Mar. 28, 1989, to Wilburn et al., discloses a mobile incident log suited for long-term, dedicated monitoring of on-board vehicle computers and their sensors. The system stores as incidents the microprocessor bus states, as well as microprocessor random access memory variables and external sensor input variables.

None of these monitoring systems fully satisfy the needs of today's business travelers.

SUMMARY OF THE INVENTION

It is one objective of the present invention to provide a travel expense tracking system which electrically couples to the vehicle and tracks mileage and trip times with a personal computer.

It is another objective of the present invention to provide a travel expense tracking system which records mileage directly from the vehicle, and which also accounts for out-of-pocket expenses.

It is still another objective of the present invention to provide an expense tracking system which records mileage directly from a vehicle, and which interfaces with a calendar system on a personal computer.

The objectives are achieved as is now described. An expense tracking system is provided for use with the portable computer having a computer memory, a computer keyboard, and a display screen, in a vehicle of the type which generates an electrical odometer signal corresponding to the distance traveled by the vehicle. A mileage tracking hardware module is electrically coupled to the portable computer for receiving the electrical odometer signals from the vehicle, and for generating a mileage signal which is readable by the portable computer. A computer program is resident in memory of the portable computer and is operable in a mileage tracking mode for receiving data relating to the trip purpose, trip contact, and trip time, and for receiving the mileage signal from the mileage tracking hardware module and grouping data of the mileage signal with the trip purpose, trip contact, and trip time data, and for storing the group data in the memory of the portable computer.

Additional objects, features and advantages will be apparent in the written description which follows.

BRIEF DESCRIPTION OF THE DRAWINGS

FIG. 3 is a sample of one type of trip log generated by the expense tracking system of the present invention;

FIGS. 11a, 11b, and 11c are representations of display screens employed in the scheduler subroutine of the expense tracking system of the present invention.

DETAILED DESCRIPTION OF THE INVENTION

Figure 1:
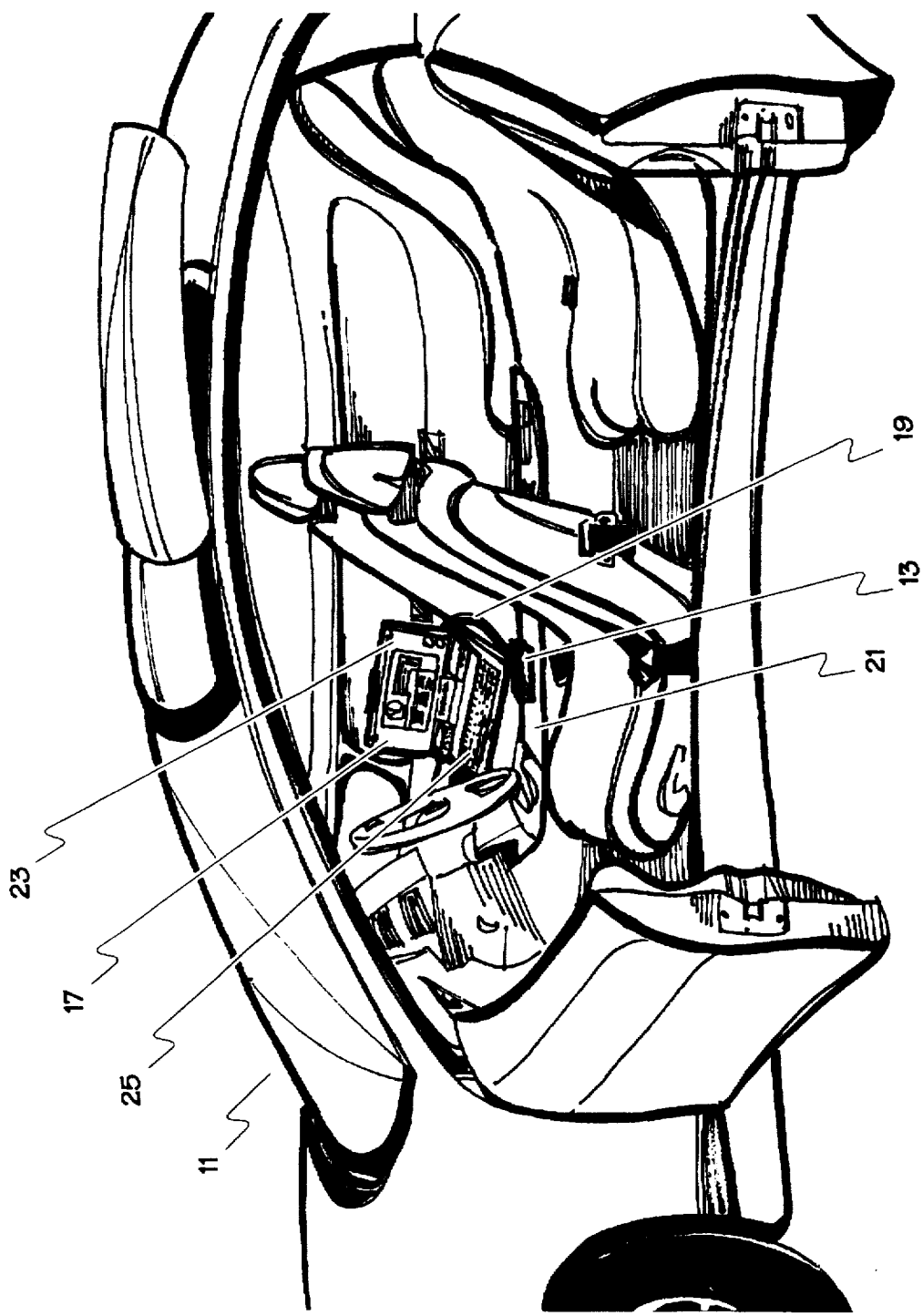
FIG. 1 is a perspective view of the vehicle-based, portable computer moderated expense tracking system of the present invention.

FIG. 1 is a perspective view of the vehicle-based portable computer moderated expense tracking system of the present invention, installed in vehicle 11. The system includes mileage tracking hardware module 13, which is releasably electrically coupled via cable 19 to portable computer 17. Portable computer 17 includes a computer program 15 for receiving and recording mileage and other data. In the preferred embodiment, mileage tracking hardware module 13 is permanently mounted within vehicle 11, for example at console 21.

In the preferred embodiment, portable computer 17 includes a keyboard 25 for entering data, and display screen 23 for displaying program screens. Mileage tracking hardware module 13 is electrically coupled to the vehicle odometer system 27. Many vehicles include odometer systems which generate a series of electrical pulses in response to advancement of the vehicle. The electrical pulses are directed to an electrical odometer for display to the vehicle operator. Therefore, in most late model vehicles, there exists a signal source within the vehicle which contains an electrical signal which is proportional to the distance traveled by the vehicle. The mileage tracking hardware module 13 receives electrical odometer signals from vehicle 11, and generates a mileage signal which is directed to portable computer 17.

Figure 2A:
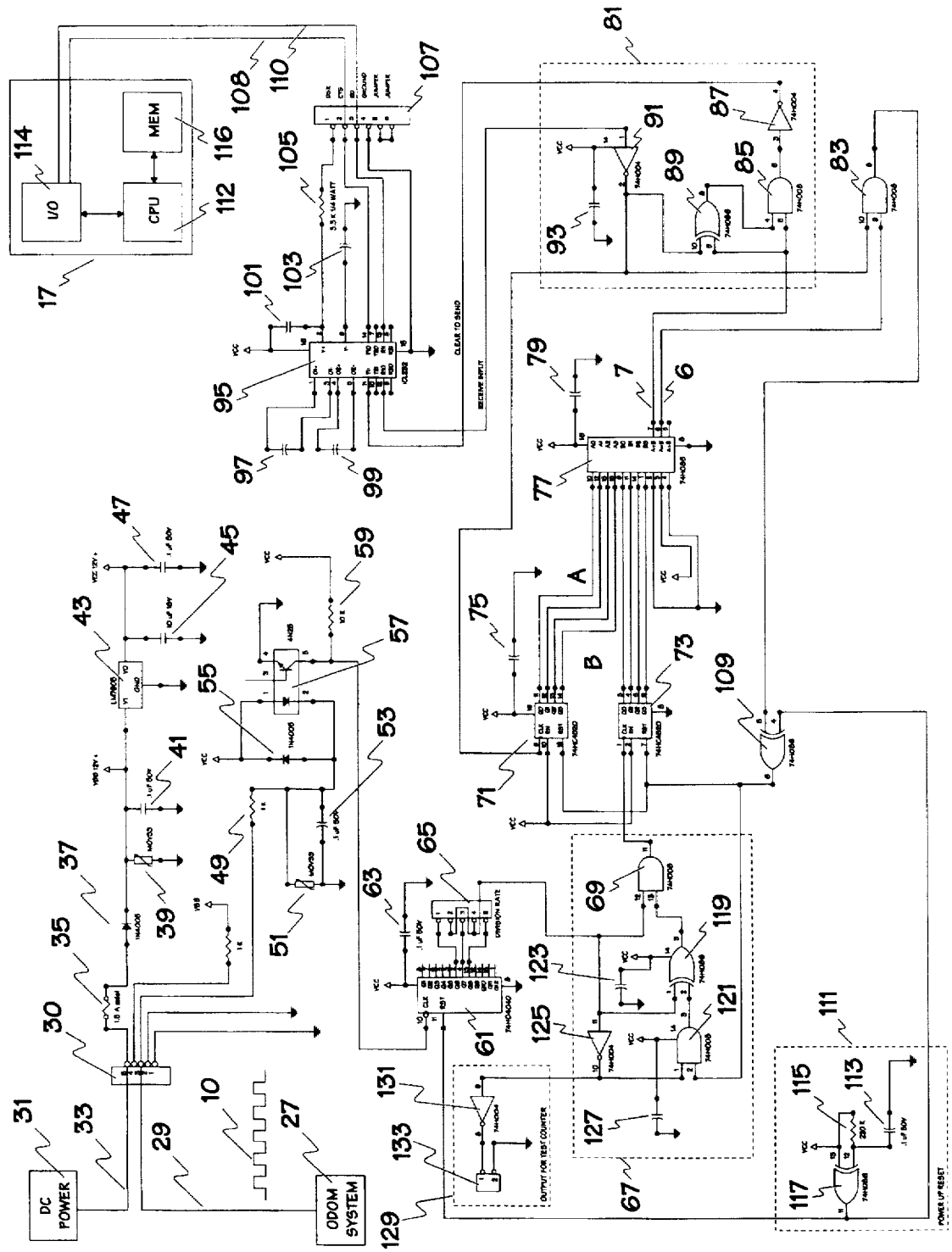
FIG. 2a is an electrical schematic of the preferred mileage conversion circuit of the present invention, which couples between the vehicle and the portable computer.

FIG. 2a is an electrical schematic of the preferred mileage conversion circuit of the present invention, which couples between vehicle 11 and portable computer 17. As discussed, odometer system 27 generates an electrical signal which corresponds to the distance traveled by vehicle 11. This odometer signal 10 is transmitted via cable 29 to mileage tracking hardware module 13. Vehicle 11 also includes vehicle power system 31 which is linked via power cable 33 to mileage tracking hardware module 13. Both the electrical odometer signal and the power signal are routed to header 30 of mileage tracking hardware module 13.

Power cable 33 provides electrical power to the various components of mileage tracking hardware module 13. The power signal is routed through fuse 35, which is a 1.5 amp fuse. The power signal is then directed to diode 37 which serves to protect the circuitry of mileage tracking hardware module 13 from negative voltages and the like. Surge protector 39 is connected to the input of voltage regulator 43. Spike filter 39 and capacitor 41 are connected in parallel between the input of voltage regulator 43 and ground. In the preferred embodiment, spike filter 39 comprises a 33 volt spike filter. The circuitry is designed so that positive 12 volts is applied to the input of voltage regulator 43, and positive 5 volts is provided at the output of voltage regulator 43. Capacitors 45, and 47 are coupled between the output of voltage regulator 43 and ground, to smooth the voltage. Thus, two DC voltage levels are provided: VBB which is 12 volts, and VCC which is 5 volts.

The odometer signal 10 from odometer system 27 is routed through header 30, then to current limiting resistor 49. Spike filter 51 is coupled between current limiting resistor 49 and ground. Capacitor 53 is coupled in parallel with spike filter 51. Capacitor 53 and spike filter 51 serve to protect mileage tracking hardware module 13 from noise and other irregular signals. The odometer signal is then routed to clamping diode 55, which is coupled in parallel across the input terminals of optocoupler 57. Pull up resistor 59 is coupled to the output of optocoupler 57. Optocoupler 57 serves to electrically isolate the remaining circuit components of mileage tracking hardware module 13. The output of optocoupler 57 is directed to divide-by-chip 61, and is applied to the clock input pin 10. In the preferred embodiment, divide-by-chip 61 comprises a Model No. 74HC 4040 manufactured by Intersil, Motorola, or RCA. Divide-by-chip 61 operates by receiving an input signal at clock input 10, and dividing that signal by a configurable division rate. Header 65 is provided and coupled to divide-by-chip 61 to set the preferred division rate at 256. Therefore, divide-by-chip 61 produces one pulse for each 256 pulses provided at clock input pin 10.

The output of divide-by-chip 61 is routed through reset circuit 67, which will be described in greater detail below. Specifically, the output from divide-by-chip 61 is routed through "and" gate 69 of reset circuit 67. The output of "and" gate 69 will be high if a pulse is provided from divide-by-chip 61 and if the mileage tracking hardware module is not in "reset." Reset circuit 67 operates to prevent a loss of data in the event a reset occurs while divide-by-chip 61 is providing an output signal.

The output signals of divide-by-chip 61 are routed through "and" gate 69, to counter 73. Counter 73 is a dual binary counter, preferably a Model No. 74HC 4520, manufactured by Intersil , Motorola, or RCA. For each digital pulse received from divide-by-chip 61, the binary output of counter 73 is incremented by a binary one.

The digital output of counter 73 constitutes a four bit digital signal which is present at the four output pins Q0, Q1, Q2, and Q3 of counter 73. The output is directed to digital comparator 77. Digital comparator 77 operates as a magnitude comparator, and compares the output of counter 73 with the output of another counter 71. Counter 71 is identical to counter 73, and serves to provide a four bit binary output in response to an accumulation (or count) of signals provided by portable computer 17. For purposes of exposition, the four bit binary number from counter 71 is designated as "A," and the four bit binary signal from counter 73 is designated as "B." If the binary count contained in counter 73 (B) exceeds the binary count contained in counter 71 (A), output pin 7 of comparator 77 goes high. If the binary content of counters 71 and 73 are equal, output pin 7 goes low and output pin 6 of comparator 77 goes high.

In the preferred embodiment, if the content of comparators 71, and 73 are equal (A is equal to B), the content of counters 71, 73 are reset to zero. If the count B of counter 73 exceeds count A contained in comparator 71, the signal at output pin 71 passes through protection circuit 81 to hex inverter 95. In the preferred embodiment, hex inverter 95 constitutes a Model No. ICL 232-C, manufactured by Intersil, Motorola, or RCA. The signal is routed from hex inverter 95 through header 107 over conductor 108 to the input/output circuitry 114 of portable computer 17.

The signal provided on conductor 108 is designated as a "clear to send" signal. A signal on this line indicates to portable computer 17 that the content of counter 73 exceeds the content of counter 71. In this event, portable computer 17 transmits a "receive input" signal via conductor 110. This signal is routed through header 107, hex inverter 95, and protection circuit 81. The receive input signal operates to clock counter 71 and increment the count thereof. Therefore, the four byte binary number (A) contained in counter 71 is incremented by portable computer 17 in response to the "clear to send" signal received from mileage tracking hardware module 13.

Hex inverter 95 operates to invert signals and to convert five volt TTL signals to ten volt RS232 signals, which are readable by portable computer 17. Of course, portable computer 17 communicates in eight bit ASCII characters. In the preferred embodiment, the "receive input" signal that is transmitted from portable computer 17 to mileage tracking hardware module 13 is an eight bit ASCII character corresponding to the number 127, for timing purposes, since it is unacceptable for the mileage tracking hardware module to simultaneously receive a "receive input" signal and send a "clear to send" signal.

Portable computer 17 does not directly read the content of counter 73. Rather, portable computer 17 "infers" the count contained in counter 73 by receiving a "clear-to-send" signal from mileage tracking hardware module 13 (which indicates that counter 73 has a binary count which exceeds that of counter 71) and sending a "receive input" signal (an ASCII 127) to the clock input of counter 71 to increment the content of counter 71. Portable computer 17 repeatedly sends "receive input" signals to counter 71, all the while maintaining a count (with computer program 15) of the total number of ASCII signals sent. When the content of counter 71 equals that of counter 73, portable computer 17 will no longer receive a "clear-to-send" signal from mileage tracking hardware module 13. Also, when the content of counter 71 equals that of counter 73, counters 71, 73 are reset.

Figure 2B:
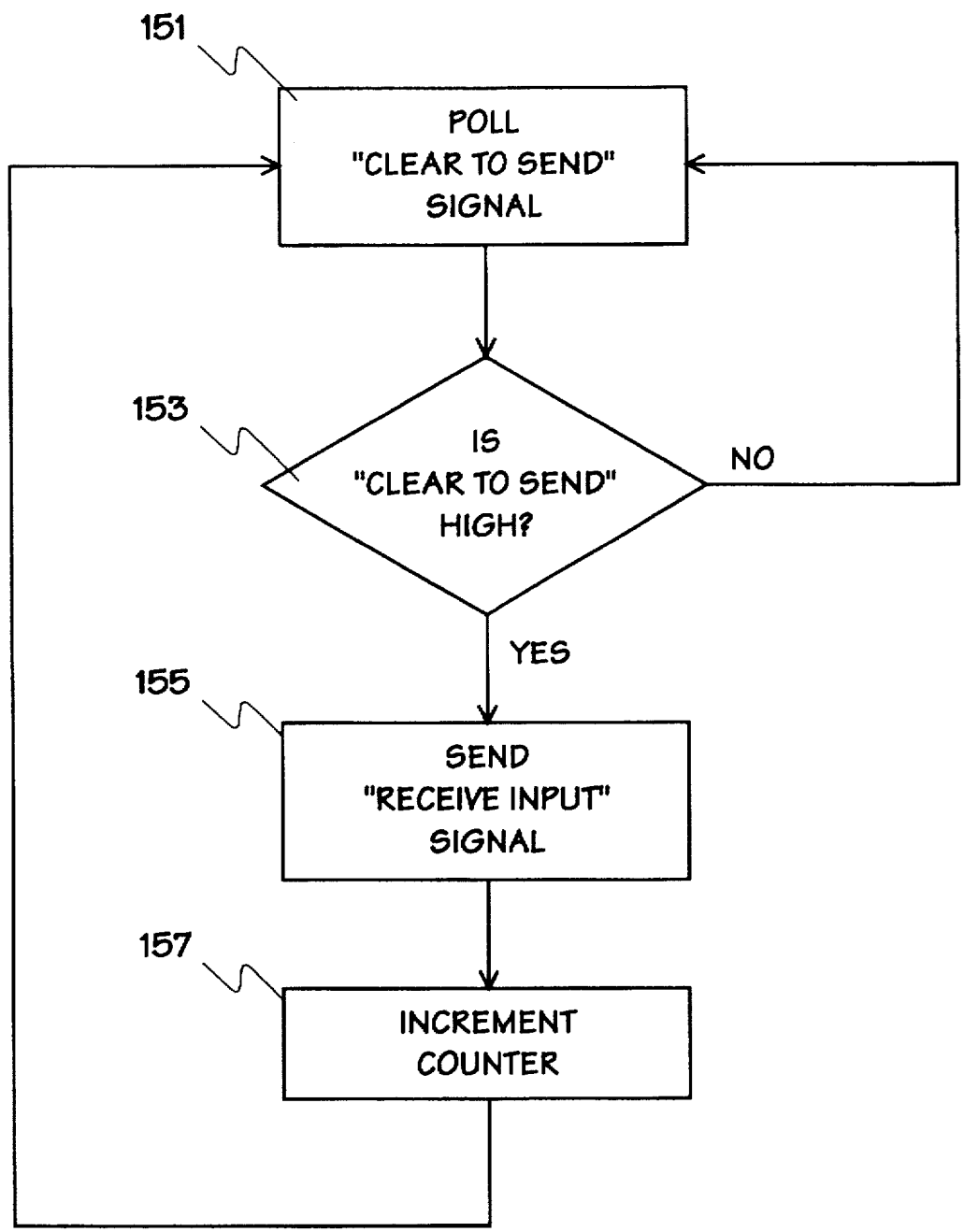
FIG. 2b is a flow chart of the routine which allows the computer program to "read" mileage data from mileage tracking hardware module.

FIG. 2b is a flow chart diagram of the logic employed by computer program 15 of portable computer 17 to "infer" the count contained in counter 73. Of course, computer program 15 is resident in memory 116, and is executed by CPU 112 of portable computer 17. CPU 112 continuously polls the input ports of input/output port 114, and in particular continuously polls the line which carries the "clear to send" signal.

In step 151 of the flow chart, the computer polls the "clear to send" signal. Next, in step 153, the computer determines if the "clear to send" signal is present. If not, the computer returns to step 151, and the "clear to send" line is continuously polled. However, if in step 153 it is determined that the "clear to send" signal is present, the process continues in step 155.

In step 155, the computer generates an ASCII 127 for transmission on the line which carries the "receive input" signal. As stated above, the "receive input" signal is transmitted through hex inverter 95, protection circuit 81, to counter 71.

The computer program then returns to step 151 for continuous polling of the "clear to send" signal line. Computer program 15 will continue this process until the binary number present in counter 71 equals the binary number in counter 73. In other words, the polling and transmission continues until the value of binary A equals the value of binary B. Once counters 71, 73 are reset, portable computer 17 continues polling for the next "clear to send" signal.

This system of transferring data from mileage tracking hardware module 13 to portable computer 17 allows portable computer 17 to execute other software. Without such a system, portable computer 17 would be dedicated to continuous monitoring of the output of mileage tracking hardware module 13. This would be an under-utilization of portable computer 17. With this system, portable computer 17 can be occupied executing other software while data pertaining to the mileage traveled is accumulated in counter 73. Portable computer 17 may then periodically poll to determine if data has been accumulated in counter 73. The "clear to send" signal is an indication to portable computer 17 that data has been accumulated for retrieval. Portable computer 17 will then transmit a series of ASCII characters identified as the "receive input" signals until the count of counter 71 equals that of counter 73. At that time, counters 71, 73 are reset.

Figure 2C:
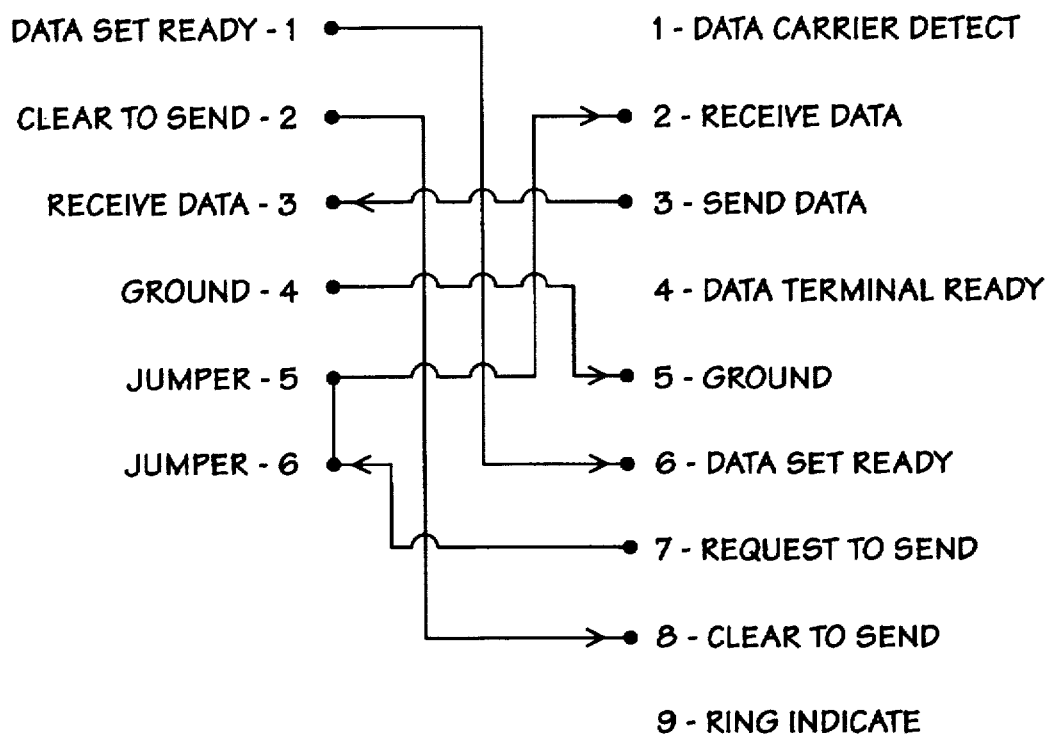
FIG. 2c is a diagram of the wiring between the data tracking hardware module and the laptop computer.

FIG. 2c depicts the electrical connection between mileage tracking hardware module 13 and portable computer 17. In the preferred embodiment, portable computer 17 comprises a Toshiba brand laptop computer. Preferably, mileage tracking hardware module 13 electrically connects to portable computer 17 through the RS232 port of portable computer 17. In FIG. 2c, the pinout configuration from buffer 107 is depicted in the column entitled "Mileage Tracking Hardware Module." The pinout configuration of the RS232 port of portable computer 17 is depicted in the column entitled "Laptop Computer." The pinout of the mileage tracking hardware module 13 is as follows:

(1) data set ready
(2) clear to send
(3) receive data
(4) ground
(5) jumper
(6) jumper.

The pinout configuration of the RS232 port of laptop computer 17 is as follows:

(1) data carrier detect
(2) receive data
(3) send data
(4) data terminal ready
(5) ground
(6) data set ready
(7) request to send
(8) clear to send
(9) ring indicate.

In the preferred embodiment, the "data set ready" terminal of mileage tracking hardware module 13 is electrically coupled to the "data set ready" terminal of portable computer 17. The "clear to send" terminal of the mileage tracking hardware module 13 is electrically coupled to the "clear to send" terminal of portable computer 17. The "receive data" terminal of mileage tracking hardware module 13 are electrically coupled to the "send data" terminal of portable computer 17. The "ground" terminal of mileage tracking hardware module 13 is electrically coupled to the "ground" terminal of portable computer 17. The "jumper" terminals of mileage tracking hardware module 13 are coupled together. The "jumper" terminals of mileage tracking hardware module 13 is electrically coupled to the "receive data" terminal of portable computer 17. The "jumper" terminals of mileage tracking hardware module 13 are also electrically coupled to the "request to send" terminal of portable computer 17.

In this configuration, portable computer 17 communicates with mileage tracking hardware module 13 through the "send data" terminal and the "clear to send" terminal. Communication from portable computer 17 to mileage tracking hardware module 13 is accomplished at the "send data" terminal of portable computer 17. Communication from mileage tracking hardware module 13 to portable computer 17 is accomplished by directing signals from mileage tracking hardware module 13 to the "clear to send" terminal of portable computer 17.

Mileage tracking hardware module 13 of the present invention operates much like a modem. In order to understand its operation, it is important to understand the operation of a modem. In normal operation, when portable computer 17 wants to access the external modem, it turns on the "data terminal ready" terminal (pin 4 in FIG. 2c) to signal the modem. The modem responds by turning on the "data set ready" terminal (pin 6 in FIG. 2c). After receiving the "data set ready" signal from the modem, portable computer 17 turns on the "request to send" terminal (pin 7 in FIG. 2c) to the modem. When the modem is ready to receive data from the portable computer 17, the modem sends a "clear to send" signal to the "clear to send" terminal (pin 8 of FIG. 2c) of portable computer 17. After the "data terminal ready," "data set ready," "request to send," and "clear to send" signals have all gone high, the portable computer 17 is ready to send data to the modem through the "send data" terminal (pin 3 of FIG. 2c). Data coming from the remote modem is received at portable computer 17 on the "receive data" terminal (pin 2 of FIG. 2c).

The mileage tracking hardware module 13 of the present invention is designed to use these same signals, but in a slightly different manner. Mileage tracking hardware module 13 generates a "data set ready" signal (at pin 1 of mileage tracking module 13) and directs it to the "data set ready" terminal (pin 6 of FIG. 2c) of portable computer 17. When the electronics generate a first pulse from the vehicle odometer system 27, mileage tracking hardware module 13 generates a "clear to send" signal which is transferred from the "clear to send" terminal (pin 2 of mileage tracking hardware module 13) to the "clear to send" terminal (pin 2 of FIG. 2c) of portable computer 17. Portable computer (through operation of computer program 15) checks the status of the port, and recognizes that a signal has been received at the "clear to send" terminal, and prepares to send the ASCII 127 character. Before the character can be sent, portable computer 17 must first turn on the "request to send" terminal and receive a "clear to send" signal at pin 7. Of course, when an advance in mileage has been detected by mileage tracking hardware module 13, the "clear to send" signal remains high until the counters are reset. Since the "clear to send" signal is high, portable computer 17 then transmits the ASCII representation of the 127. The ASCII 127 is sent from the "send data" terminal of portable computer 17 to the "receive data" terminal of mileage tracking hardware module 13.

After transmitting the ASCII character 127, portable computer 17 once again checks the port status to determine if a "clear to send" signal is present. If so, it must be determined if the "clear to send" signal indicates a new increment in mileage, or if it is merely the previous "clear to send" signal which has not been terminated due to the time delay in resetting the counters after receipt of the ASCII character 127. Some computers, such as those equipped with 386 processors, are fast enough to recheck the port status before mileage tracking hardware module 13 can turn off the "clear to send" signal. Older laptops, such as those equipped with 8088 processors, operate a speeds which will allow the "clear to send" signal to go high, low, and high again in one port status check.

This problem is resolved by use of the "Delta clear to send" register, which reflects changes in the "clear to send" terminal. In portable computers with fast processors, after the ASCII 127 character is sent, portable computer 17 checks the "Delta clear to send" register to determine if there has been a change in the "clear to send" status during the transmission of the ASCII 127 character. Usually, the "Delta clear to send" register will be set to zero, indicating that no status changes in the "clear to send" signal have occurred. Therefore, no additional ASCII characters will be sent to mileage tracking hardware module 13.

For slower portable computers, the "Delta clear to send" register is checked after each transmission of the ASCII character. If "clear to send" is high, and the content of the "Delta clear to send" register is also high, the system will infer that a mileage increment has occurred during the transmission of the last ASCII character, and will then transmit another ASCII character.

Protection circuit 81 includes a number of digital logic gates which cooperate to prevent the transmission of a "clear to send" signal when a "receive input" signal is being received. As stated above, output pin 6 of comparator 77 goes high when the content of counter 71 equals that of counter 73. This output is "anded" at "and" gate 85 with the output from "exclusive or" gate 89. "Exclusive or" gate 89 has two inputs: an input from pin 7 of comparator 77 (which is high if B is greater than A), and the inverted "receive input" signal from inverter 91. (The "receive input" output of hex inverter 95 is ordinarily high, and is pulled low when a "receive input" signal is generated by personal computer 17. Therefore, the "receive input" signal from hex inverter 95 must be inverted by inverter 91 before transmission to the clock input of counter 71.)

The "exclusive or" gate 89 operates to prevent the generation of a "clear to send" signal if a "receive input" signal is being received by protection circuit 81. Inverter 87 operates to invert the output of "and" gate 85 to provide a low "clear to send" signal to the input of hex inverter 95. As discussed above, the logic signals are inverted at hex inverter 95 so inversion is required by inverter 87.

"And" gate 83 controls the resetting of counters 71, 73. It receives two inputs: one from output pin 6 of comparator 77, and the other from the clock input of counter 71. "And" gate 83 will go high if the value of A is equal to the value of B, and counter 71 is receiving a "receive input" signal. Only at this instant, will "and" gate 83 go high. The output of "and" gate 83 feeds into "exclusive or" gate 109. The other input for "exclusive or" gate 109 is from power-up protection circuit 120.

Power-up protection circuit 120 includes "exclusive or" gate 117, which has an input coupled to capacitor 113, and resistor 115. When the system is powered-up, one input of "exclusive or" gate 117 goes high to the VCC voltage. The divide-by-chip 61 and the counters 71, 73 are reset as the capacitor 113 is charged. Resistor 115 sets the charge time for the capacitor 113. In the preferred embodiment, this charge time is approximately fifteen milliseconds. When capacitor 113 is fully charged, the output of "exclusive or" gate 117 goes low. Therefore, "exclusive or" gate 119 receives a reset input from "and" gate 83, and the output of power-up protection circuit 120. The output of "exclusive or" gate 117 is also routed to the reset pin of divide-by-chip 61.

Reset circuit 67 is provided to prevent the loss of mileage data in the event a signal is produced by divide-by-chip 61 simultaneous with a resetting of counter 73. This is accomplished by the operation of inverter 125, "and" gate 121, "exclusive or" gate 119, and "and" gate 69. The output of divide-by-chip 61 is provided at one input of "and" gate 69, one input of "exclusive or" gate 119, and inverter 125. The output of inverter 125 is provided to one input of "and" gate 121. "And" gate 121 additionally receives the output of "exclusive or" gate 109. The output of "and" gate 121 is provided as an input to "exclusive or" gate 119, along with the output of divide-by-chip 61. The output of "exclusive or" gate 119 is "anded" with the output of divide-by-chip 61 at "and" gate 69. Of course, the output of "and" gate 69 is directed to the clock of counter 73.

In analyzing reset circuit 67, it is important to understand that in the preferred embodiment a reset pulse has a duration of approximately ten to fifteen milliseconds and a clock pulse from divide-by-chip 61 has a duration of approximately five hundred milliseconds. "Exclusive or" gate 119 ensures that the output of "and" gate 69 will not go high if the system is reset when a signal is received from divide-by-chip 61. When no signal is provided by divide-by-chip 61, inverter 125 operates to provide a high signal at one input of "and" gate 121. If a reset occurs at this time, another high signal is provided at the other input of "and" gate 121, and the output of "and" gate 121 goes high, and is fed into "exclusive or" gate 119. If a pulse is then produced by divide-by-chip 61 at this time, a high signal is provided at the opposite input of "exclusive or" gate 119, and the output of "exclusive or" gate 119 goes low for as long as the "reset" signal is present. This pulls the output of "and" gate 69 low for the duration of the reset pulse (for approximately ten to fifteen milliseconds). Since the clock pulse provided by divide-by-chip 61 is five hundred milliseconds in length, when the reset signal expires, "and" gate 69 is no longer disabled, and a clock pulse is provided by "and" gate 69 to counter 73.

Test head 129 is provided with header 133 and inverter 131 to allow monitoring of the mileage hardware tracking module 13.

FIG. 3 is a sample of one type of trip log generated by the expense tracking system of the present invention. The trip log includes a number of columns which contain information relating to particular trips taken by the vehicle operator. The columns include: date column 161, trip purpose column 163, contact column 165, odometer start point 167, odometer endpoint 169, total mileage 171, start time 173, and end time 175. For example, as shown in the trip log of FIG. 3, on Mar. 4, 1990, the vehicle operator conducted an interview with Dr. Bobby Wilkins. The odometer reading at the beginning of the trip was 143,093.55. The odometer reading at the end of the trip was 143,097.88. The total mileage of the trip was 4.33 miles. The starting time for the trip (in military time) was 13:09:37. The ending time for the trip was 13:30:54. The data contained in a trip log may be summarized in as shown at summary 177. Summary information may include an indication on the total number of trips taken, the total number of interviews, the total miles driven, the total driving time, and the total interviewing time.

In the system of the present invention, the information relating to date, trip purpose, and contact are entered into portable computer 17 at keyboard 25. Additionally, the "current" vehicle odometer reading must be entered into computer program 15 of portable computer 17 by keyboard 25. Computer program 15 of the present invention then operates to calculate mileage. The computer program 15 of the present invention also includes a real time clock which serves to record the time at which certain events occurred. For example, the start time of start time column 173 is established when a new entry is provided to computer program 15. The entry will include information on trip purpose and contact. In the preferred embodiment, the computer program may either automatically determine the ending time or establish the ending time of a trip upon command from keyboard 25.

Figure 4:
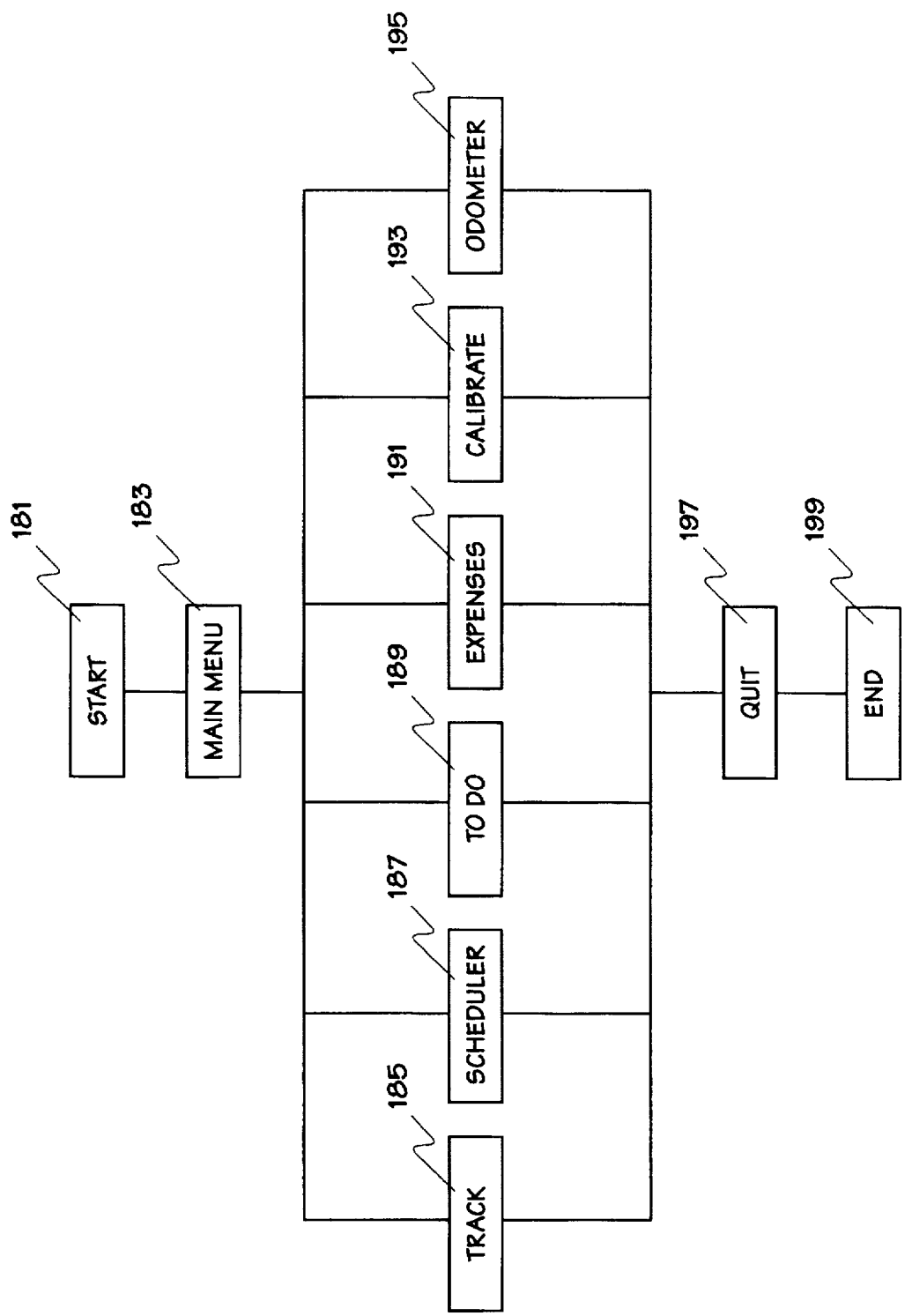
FIG. 4 is flow chart of the main menu of the computer software of the expense tracking system of the present invention.

FIG. 4 is a flow chart of the main menu of computer software 15 of the expense tracking system of the present invention. The program is booted up in portable computer 17 at step 181. A main menu is displayed in step 183. The main menu includes a number of user options, including track 185, scheduler 187, to-do 189, expense 191, calibrate 193, and odometer 195. The operator is prompted to select one or more of these user options. Once the selections are made, the user quits in step 197, and the selection process ends in step 199. The calibrate option 193 is discussed in greater detail below in connection with FIG. 5. The odometer option 195 is discussed in greater detail in connection with FIG. 6 below. The track option 185 is discussed in greater detail in connection with FIG. 7. The expense option 197 is discussed below in greater detail in connection with FIG. 10. The scheduler option 187 is discussed below in greater detail in connection with FIG. 11. The to-do option 189 is discussed below in connection with FIG. 12.

Figure 5:
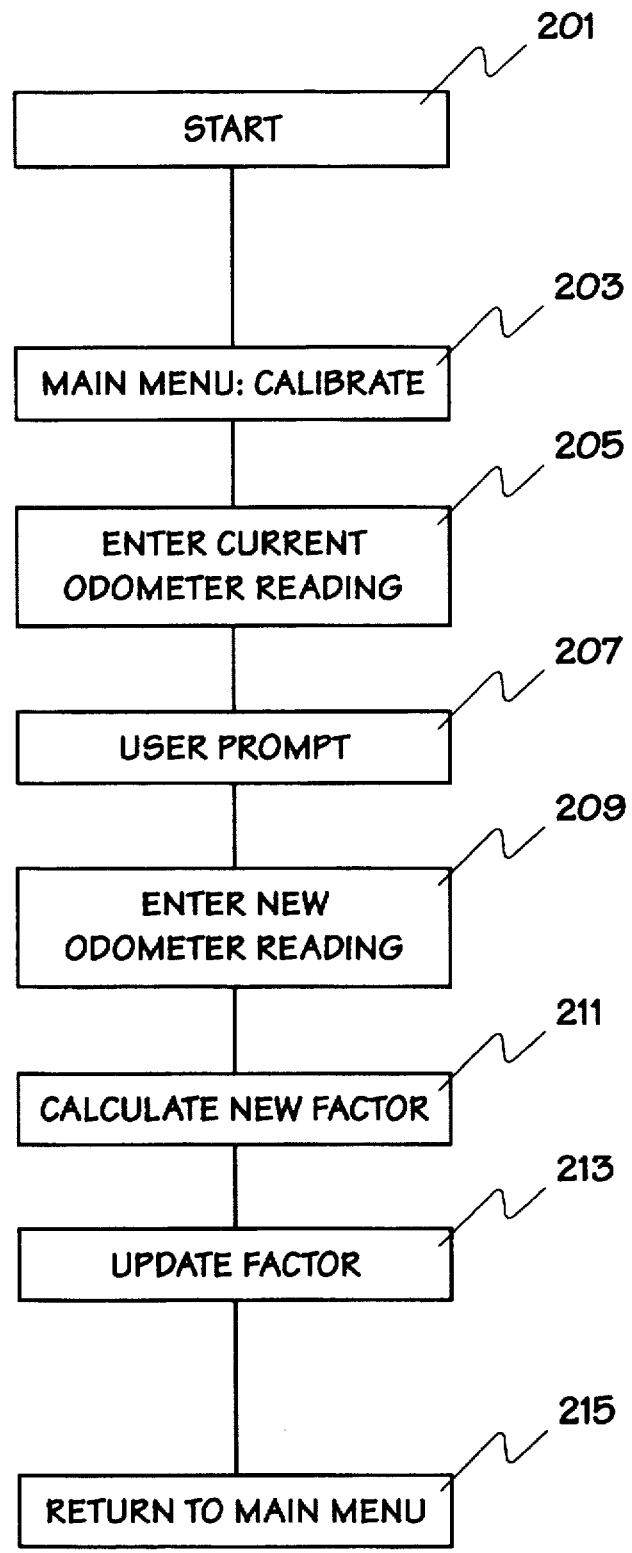
FIG. 5 is a flowchart representation of the preferred calibration subroutine of the expense tracking system of the present invention.

FIG. 5 is a flow chart representation of the preferred calibration subroutine of the expense tracking system of the present invention. The calibration subroutine begins in step 201. In step 203, the main menu informs the user that the odometer system of the present invention is to be calibrated. In step 205, portable computer 17 prompts the user to enter the current vehicle odometer reading. After the odometer reading is entered into portable computer 17 by keyboard 25, in step 207, the mileage tracking hardware module 13 of the present invention instructs the user to drive a predetermined distance (or time interval). After a predetermined distance, the vehicle operator is prompted, in step 209, to enter the current odometer reading. In step 209, the user enters the new odometer reading.

From the two odometer readings, and the data generated by the mileage hardware tracking module 13, computer program 15 can accurately calculate a mileage factor in step 211. This factor will relate the number of odometer signals sensed by mileage tracking hardware module 13 to the mileage traversed by the vehicle. For example, with a divide-by-chip reduction of two hundred and fifty-six pulses, it is likely that the mileage tracking hardware module 13 of the present invention will generate sixty or more pulses (i.e., "receive input" signals) for each mile traversed by the vehicle. In step 213, the new mileage factor is recorded in memory for use. In step 215, the subroutine ends by returning to the main menu to allow the vehicle operator to select another option.

Figure 6:
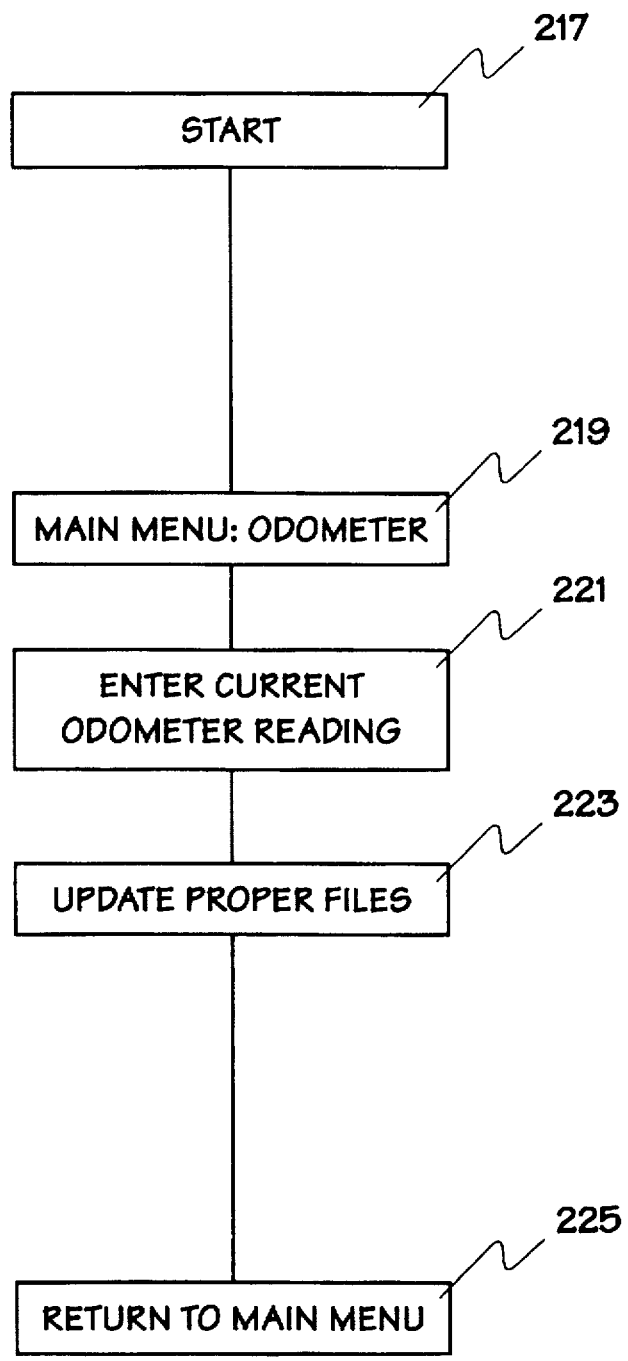
FIG. 6 is a flowchart representative of the odometer update subroutine of the expense tracking system of the present invention.

FIG. 6 is a flow chart representation of the odometer update subroutine of the expense tracking system of the present invention. The subroutine starts at step 217. In step 219, the menu informs the user that the vehicle odometer may be updated. In step 221, the vehicle operator is prompted to input the current odometer reading. Next, in step 223, the proper files are updated with the current odometer reading. In step 225, the subroutine returns to the main menu to allow the user to select another option.

The subroutine depicted in FIG. 6 is useful, since the expense tracking system may not be employed in the vehicle at all times. For example, the system may be removed from the vehicle for one or more days, and used, for example, in another vehicle. During this period of nonuse the first vehicle may be operated by others. Alternately, a vehicle which is used for both business and pleasure may be used for a number of hours or days in a mode which does not require a detailed tracking of mileage. If this is the case, resumption of tracking would not be possible without an updating of the odometer reading of this particular vehicle. The preferred expense tracking system of the present invention is thus suited for use in multiple vehicles. For example, an individual salesman may use one of a number of cars in a company pool on any particular day. He or she may couple portable computer 17 to each module tracking hardware module 13 in the particular vehicle of use. Before mileage tracking can begin, the expense tracking system of the present invention must first be calibrated to the particular vehicle, and then be updated with the current odometer reading for that particular vehicle.

Figure 7:
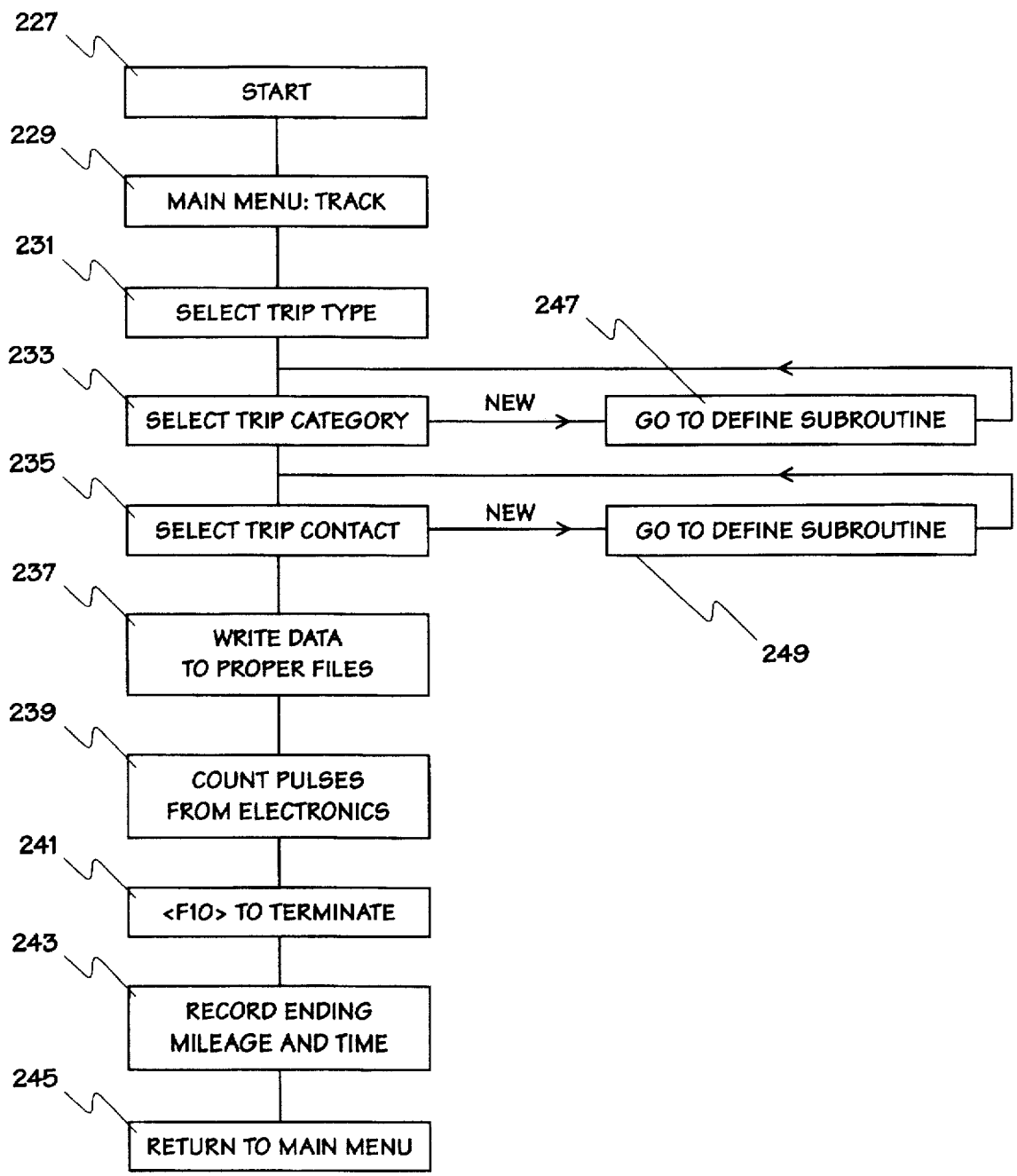
FIG. 7 is a flowchart drawing of the preferred mileage tracker subroutine of the present invention.

FIG. 7 is a flow chart drawing of the preferred mileage tracker subroutine of the present invention. Once the computer program 15 has been calibrated to the particular vehicle, and the current odometer reading has been entered for that particular vehicle, mileage tracking may begin. Tracking routine starts in step 227 and portable computer 17 automatically records the date and time. Next, in step 229, the main menu informs the operator that tracking will begin. In step 231 the user is prompted to select or enter a particular trip type. In step 233, the user is prompted to select a particular trip category. If the trip category is new, the user may go to a "define" subroutine in step 247 to define at new trip category type. In step 235, the user is prompted to select or enter a trip contact. If the contact is new, in step 249, the user may go to a "defined" subroutine to enter or identify a new trip contact. In step 237, the computer program 17 of the present invention will write the data relating to trip type, trip category, and trip contact to the proper files in computer program 15.

Next, in step 239, the computer will count pulses from the mileage tracking hardware module 13 of the present invention. When the trip is completed, the user may depress the F10 key to terminate the tracking. When the F10 key is depressed, the computer will automatically record the date and ending time of the trip in step 243. Finally, in step 245, the program returns to the main menu to allow the user to select other options.

Figure 8A:
FIGS. 8a, 8b, and 8c are graphic presentations of a series of mileage tracking sub-menus which facilitate the recordation of trip information.
Figure 8B:
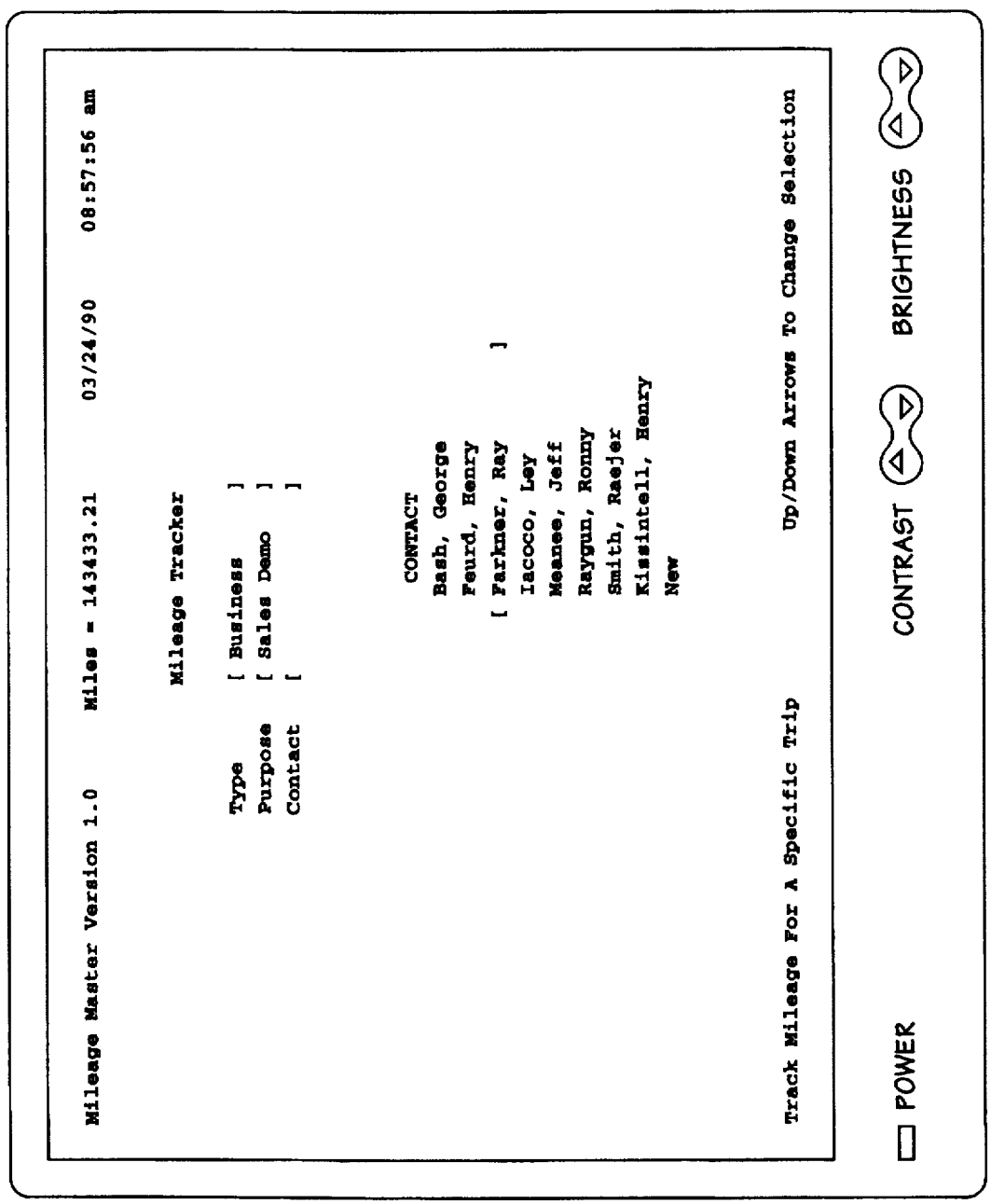
Figure 8C:
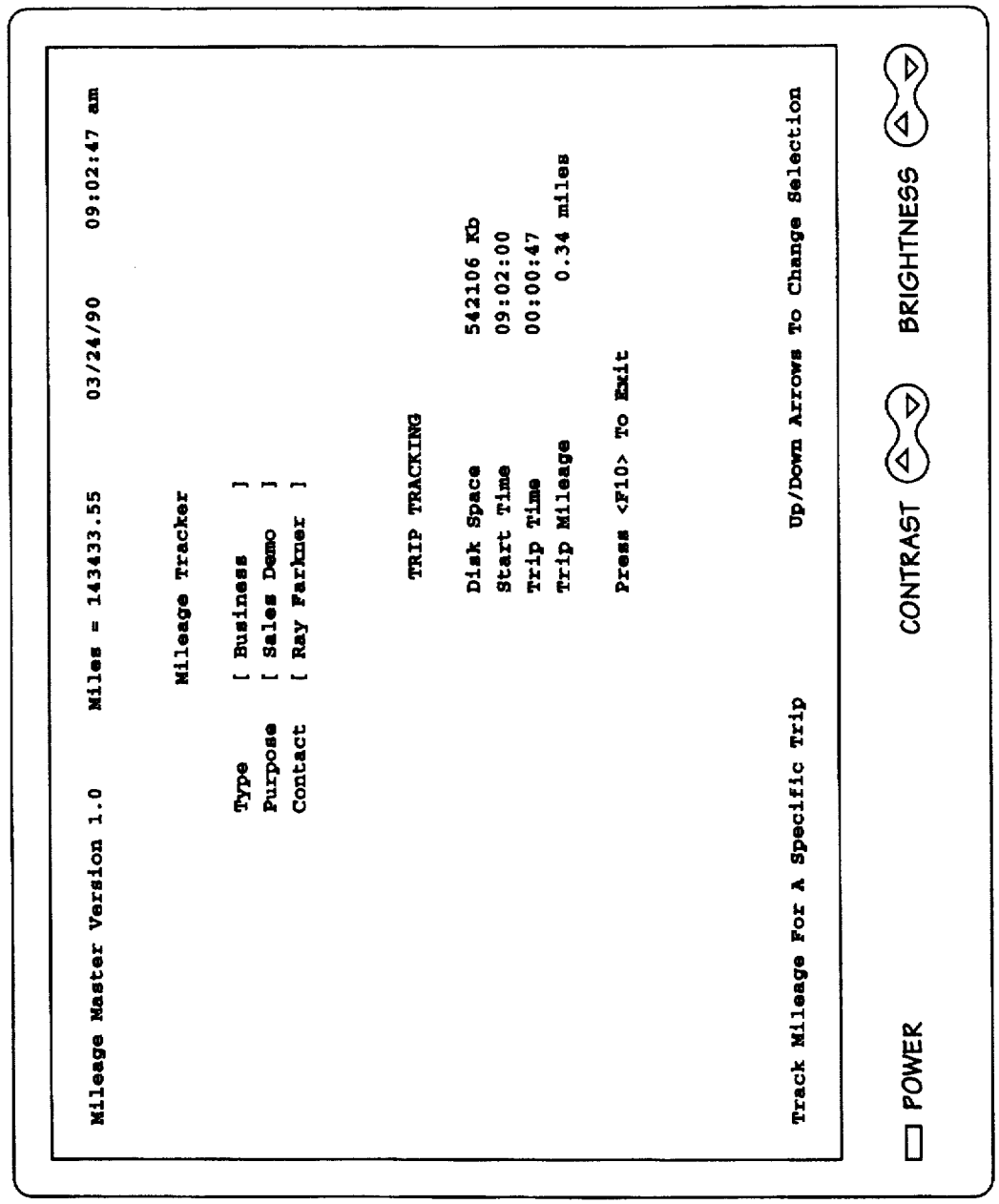

FIGS. 8a, 8b, and 8c are graphic representations of a series of mileage tracking sub-menus which facilitate the recordation of trip information. For example, FIG. 8a depicts a program screen in which the trip type has been designated as "business." The screen provides a number of preselected or preidentified trip purposes. These trip purposes may be frequently recurring trip purposes, and facilitate the use of the computer program of the present invention. The trip purpose menu may include a number of purposes such as sales call, cold call, sales demo, sales proposal, follow-up, lunch, office, and training. The particular trip purpose to be entered and associated with the trip may be selected by moving the cursor upward and downward in the trip purpose column, and depressing the enter key when a particular purpose is selected. For example, in FIG. 8a, "sales demo" may be selected by moving the cursor to that item in the menu (the cursor is shown by brackets around the "sales demo" entry). The enter key is depressed, and the trip purpose "sales demo" is copied to the appropriate memory location for identification with the trip mileage and other data.

FIG. 8b depicts a computer screen which includes a menu of important or common trip contacts. The contact menu may include a number of names that are preselected by the operator. Like the purpose menu, a contact is selected by moving the cursor upward and downward within the list until the trip contact is identified. Then, the enter key is depressed, and the particular trip contact is copied to a memory address which is identified with the trip type, trip purpose, and mileage, time and date information.

FIG. 8c depicts a computer program screen at the completion of a particular trip. The trip type, purpose, and contact are identified along with the start time, trip time, and trip mileage. This data can be printed, copied to memory, or deleted. Of course, if the expense tracking system of the present invention is used to monitor employees, deletion would not be an option available to such employees.

Figure 9:
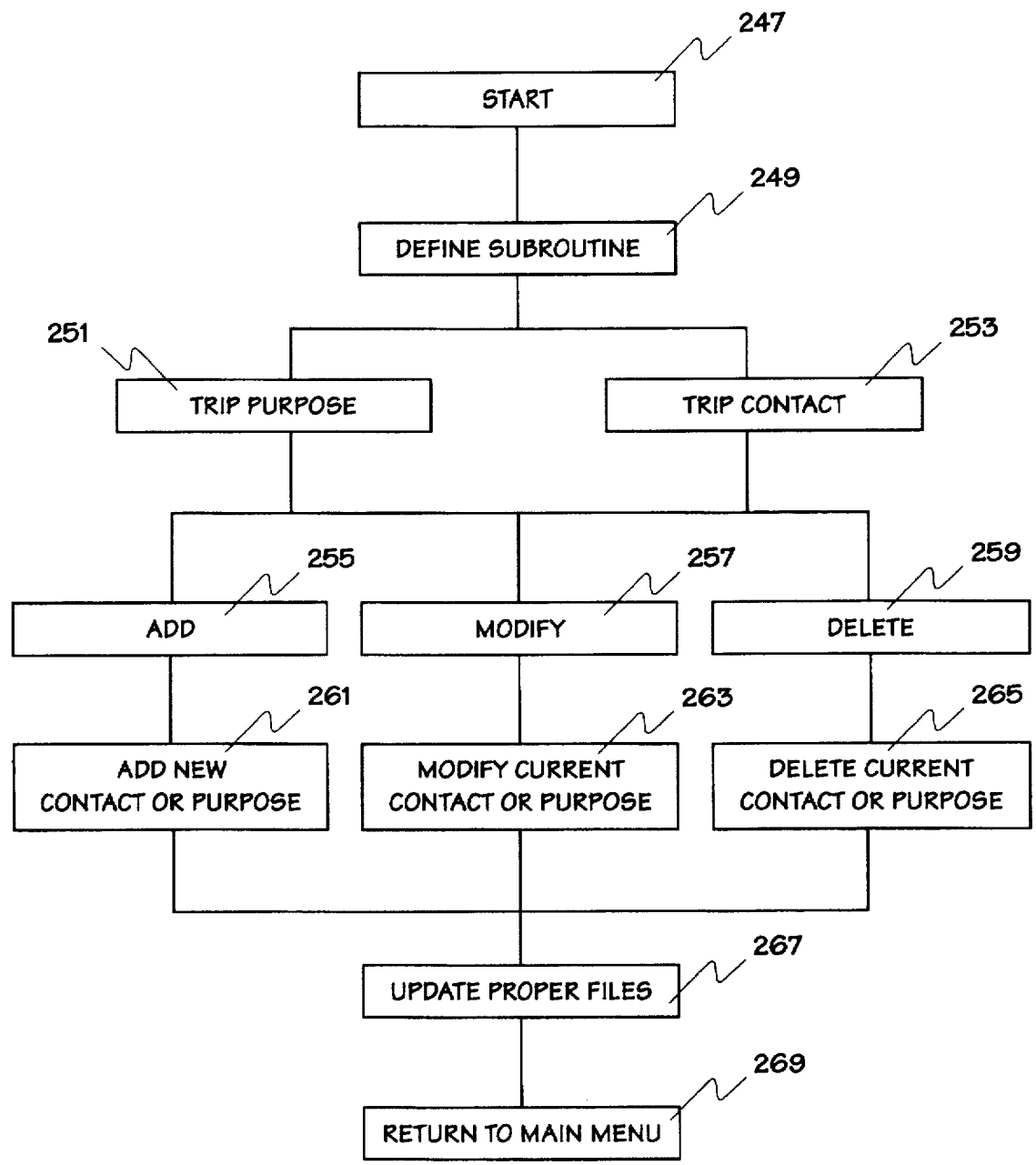
FIG. 9 is a flowchart representative of the define subroutine of the expense tracking system of the present invention.

FIG. 9 is a flow chart representation of the define subroutine of the expense tracking system of the present invention. The subroutine begins in step 247. The user is alerted that the define subroutine has been entered in step 249. The user is asked to identify what type trip information is to be defined or redefined in step 249. If "trip purpose" is selected, in step 251, the user is informed that trip purposes may be added, modified, or deleted from the menu. In step 255, an entry may be added. In step 257, an entry may be modified. In step 259, an entry may be deleted. Likewise, if a trip contact entry is to be added, modified, or deleted, the user makes a selection, and is instructed to add, modify, or delete in steps 255, 257, or 259.

The trip contact or purpose is then added, modified, or deleted in steps 261, 263, or 265. After deletions, modifications, or additions have been made, the appropriate files are updated in step 267, and the program returns to the main menu in step 269.

Figure 10:
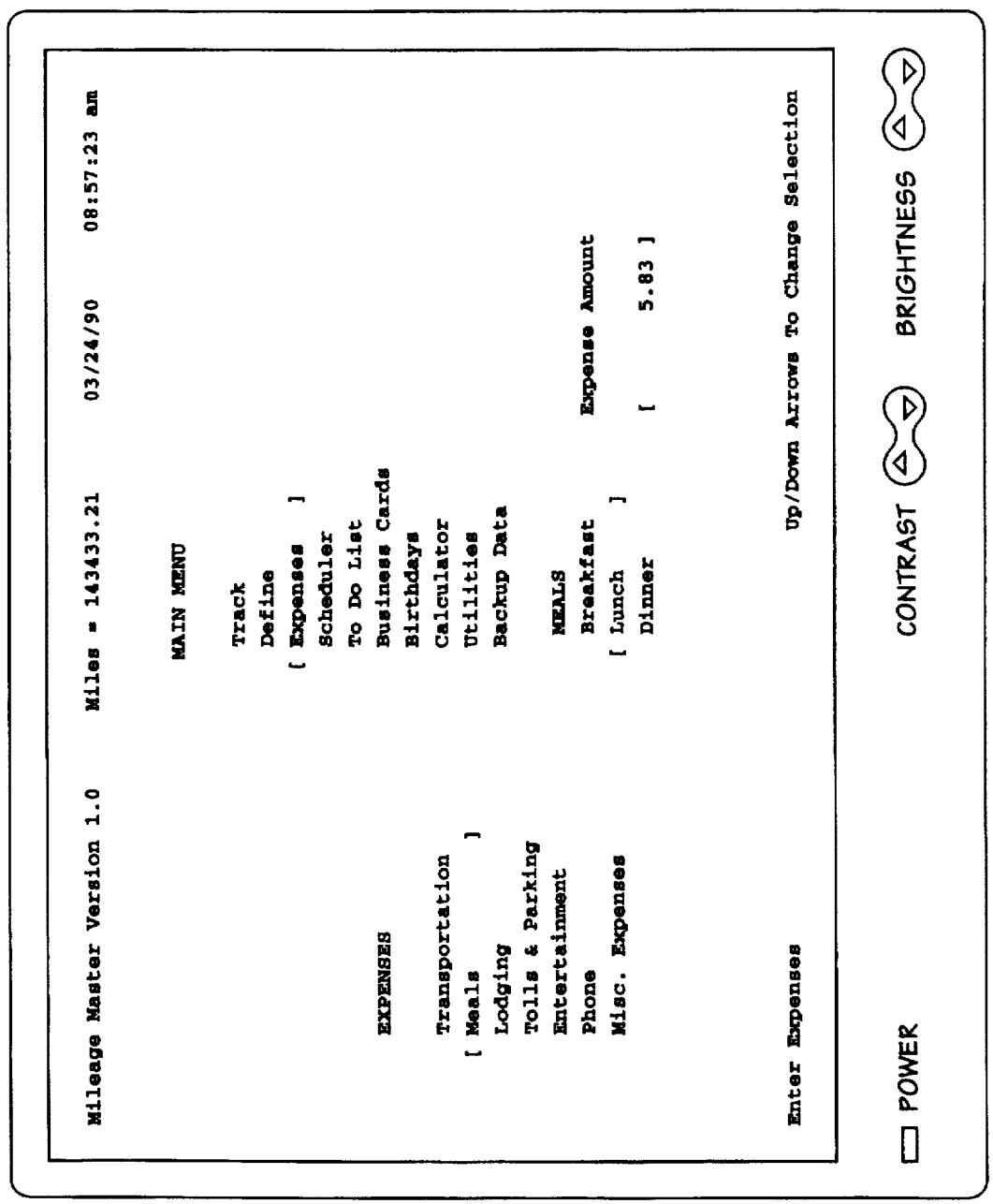
FIG. 10 is a graphic representation of a display screen for an out-of-pocket expense tracking feature of the expense tracking system of the present invention.

FIG. 10 is a graphic representation of an out-of-pocket expense tracking feature of the expense tracking system of the present invention. If the main menu item "expenses" has been selected (by moving the cursor to menu item "expenses" and depressing the enter key) three columns are provided on the menu screen: expense, meals, and expense amount. The expense column includes a number of frequently recurring expense items, such as transportation, meals, lodging, tolls and parking, entertainment, phone, etc. A "meals" column includes a number of recurring entries such as "breakfast," lunch," and "dinner." An expense amount column includes a place or places for entering a dollar amount to a particular expense. Expense items are entered to memory and identified to a particular trip by moving the cursor through these columns to select particular entries. For example, "meals" may be selected from the expense column. If so, in the "meals" column, a particular meal type may be selected, for example "lunch." Then, the expense amount may be entered in the space provided in the "expense amount" column.

Figure 11A:
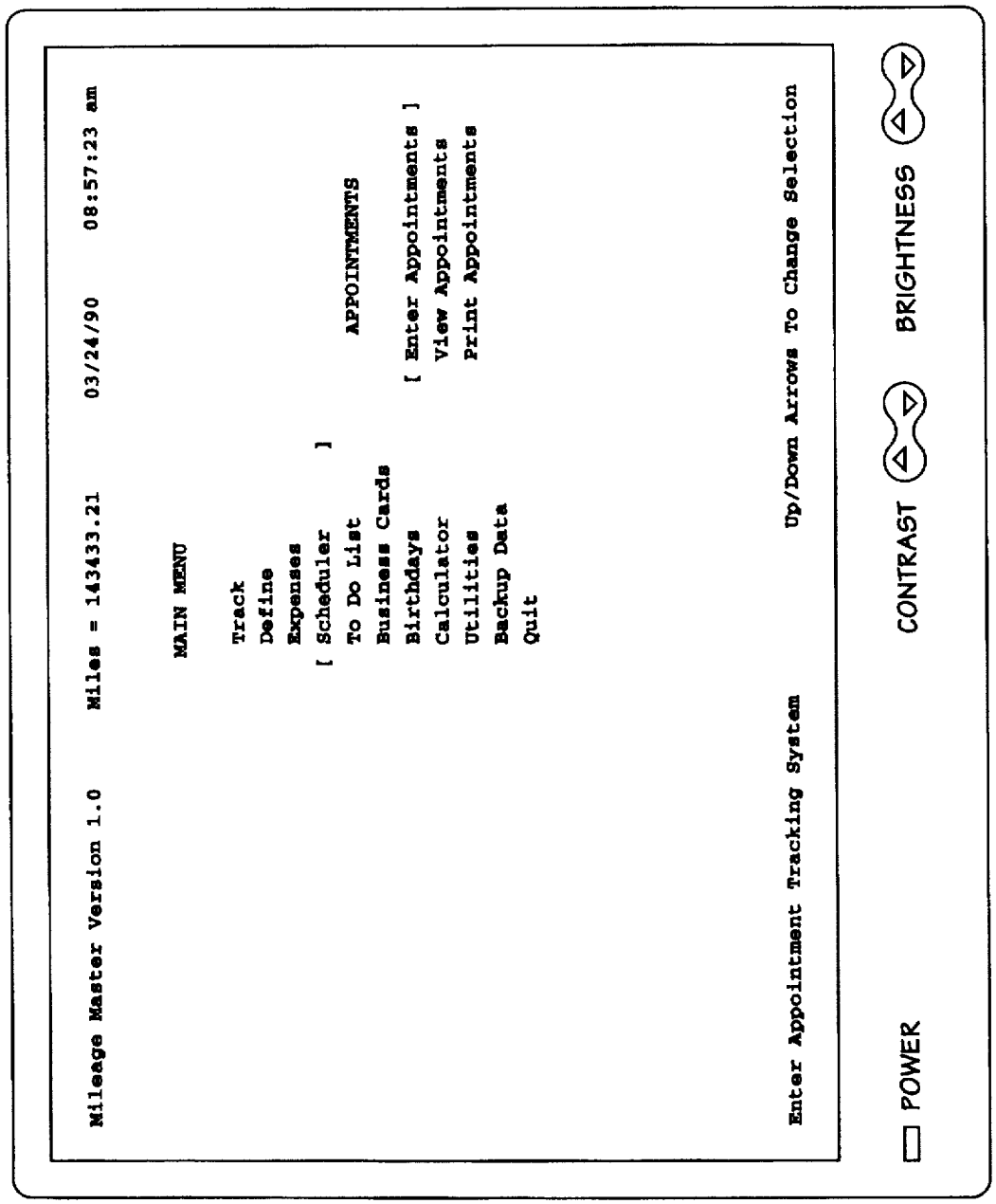
Figure 11B:
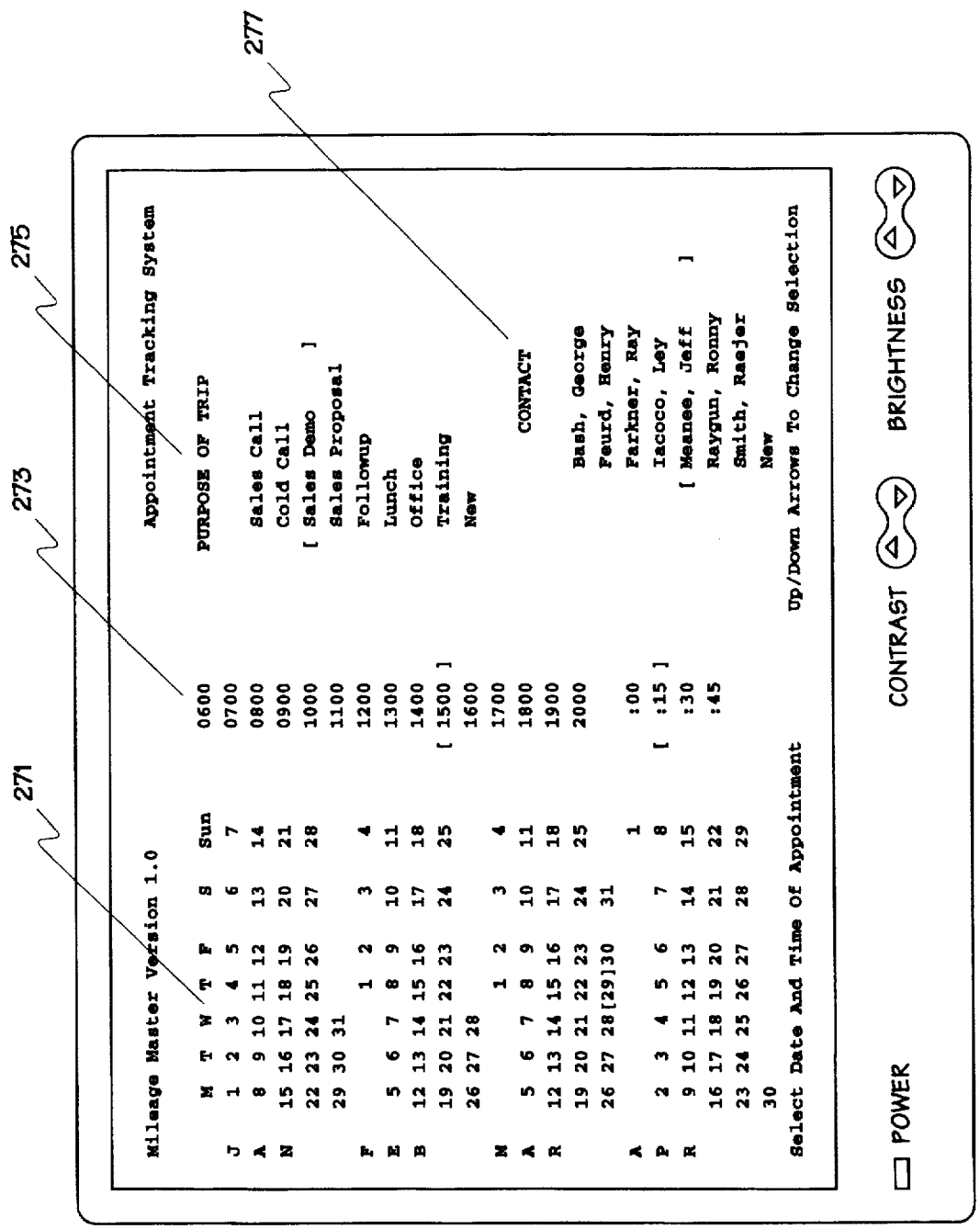

The expense tracking system of the present invention may also equipped with a calendaring system which is coordinated with the expense tracking system to facilitate recordation of expenses. FIGS. 11a, 11b, and 11c are representations of display screens employed in the scheduler subroutine in the expense tracking system of the present invention. The main menu item "scheduler" may be selected by moving the cursor to the "scheduler" item and depressing the enter key. An "appointments" column is provided on the main menu screen with a number of menu options. These options include: enter appointments, view appointments, and print appointments. The "enter appointments" option allows the operator to enter new appointments to the calendaring system. The "view appointments" option allows the user to view previous appointments. The "print appointments" option allows the user to print an appointment schedule.

FIG. 11b is representative of the screen provided after a selection of the "enter appointments" option from the main menu screen. In the preferred embodiment, a four month calendar is provided on one side of the screen. A menu of meeting times (in military time) is provided in a time column 273. A trip purpose menu 275 and contact menu 277 are also provided. The appointment is entered by moving the cursor through the calendar 271 to select a date. Then, the cursor is moved to the time column 273 to select an appointment time. Next, the cursor is moved to the trip purpose menu to select a trip purpose from the list provided. Finally, the cursor is moved to the contact menu to select the trip contacts. Of course, new trip purposes and contacts may be added to the list, and old trip purposes and contacts may be deleted from the list.

FIG. 11c depicts a schedule for a particular date which is created after a plurality of entries are made. The computer program 15 of the present invention operates to sort appointment entries by date and time, and allow them to be printed out for particular days, weeks, or months. For example, in FIG. 11c, the appointment schedule for Mar. 24, 1990, is provided. Appointments are set for 8:15, 9:30, 11:30, 1:45, 3:15, and 4:00. The various trip contacts and trip purposes are also identified in this schedule. The appointment data contained in computer program 15 may be coordinated and interfaced with the mileage tracking feature of the present invention. For example, at the beginning of the day on Mar. 24, 1990, the information relating to the 8:15 appointment may be automatically identified to the mileage tracking function, at the user's option. This minimizes the number of times particular pieces of data must be entered into the system, and minimizes the risk of erroneous entry of data relating to trip contact and purpose.

Figure 12:
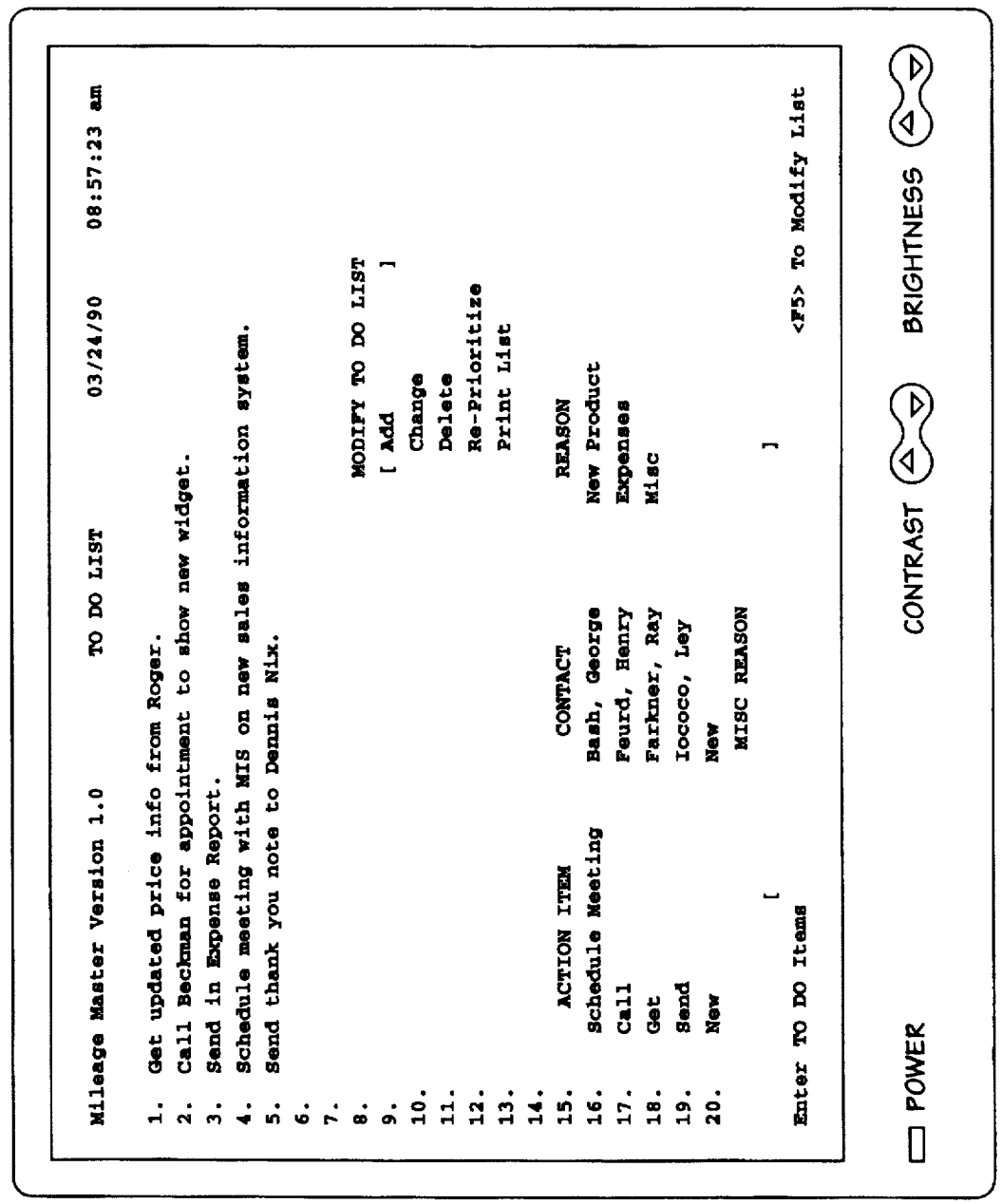
FIG. 12 is a representation of a TO-DO-LIST subroutine of the expense tracking system of the present invention.

FIG. 12 is a representation of a to-do-list subroutine of the expense tracking system of the present invention. This feature allows the business person to make contemporaneous notes during appointments. A plurality of menus may be provided on the to-do-list screen, including "action item," "contact," "reason," and "modify to-do-list." Again, the cursor is moved upward and downward in these menus to create a reminder for the to-do-list. Once all items have been selected from the various menus, the information is assembled and copied to the to-do-list. For example, the cursor may be used to select the "add" item from the "modify to-do-list." Next, the cursor may be moved to the "action item" to select "call." Then, the cursor may move to the "contact" column to select the contact, for example "George Bash." Finally, the reason for the call may be selected by moving the cursor to the "reason" column to select an entry such as "new product." Upon selection of these items, the to-do-list is updated by adding entry #6 which reads "call George Bash new product." The text may be edited by operation of keyboard 25.

While the invention has been shown in only one of its forms, it is not thus limited but is susceptible to various changes and modifications without departing from the spirit thereof.

What is claimed is:

1. A trip expense tracking system for use with a portable computer having a computer memory, a computer keyboard, and a display screen, in a vehicle of the type which generates an electrical odometer signal corresponding to distance traveled by said vehicle, comprising:

a mileage tracking hardware module electrically coupled to said portable computer for receiving said electrical odometer signal from said vehicle and for generating a mileage signal which is readable by said portable computer, including:
(a) means for receiving said electrical odometer signal corresponding to distance traveled by said vehicle and recording a quantitative indicator of distance traveled; and
(b) means for receiving and counting interrogating signals from a source external to said mileage tracking hardware module;
(c) means for communicating a status indication signal from said mileage tracking hardware module to an external target; and
(d) moans for coordinating operation of said (a) means for receiving said electrical odometer signal, (b) said means for receiving and counting, and (c) said means for communicating; and a computer program resident in said memory of said portable computer and operable in a mileage tracking mode for receiving data relating to trip purpose, trip contact, and trip time, and for generating a mileage signal from intermittent electrical interaction with said mileage tracking hardware module and grouping data of said mileage signal with said trip purpose, trip contact, and trip time data and for storing the grouped data in said memory of said portable computer.

2. A trip expense tracking system according to claim 1, wherein said portable computer includes an expansion slot and said mileage tracking hardware module is carried by said portable computer in said expansion slot.

3. A trip expense tracking system according to claim 1, wherein said mileage tracking hardware module is fixedly mounted in said vehicle and releasably electrically coupled to said portable computer by a cable.

4. A trip expense tracking system according to claim 1, wherein said electrical odometer signal differs in frequency per mile between said vehicle and other vehicles, and wherein said computer program is also selectively operable in a vehicle calibration mode during which said computer program:
(a) prompts the vehicle operator to enter the current vehicle odometer reading at said computer keyboard;
(b) prompts the vehicle operator to drive a selected distance, and depress a selected key of said computer keyboard when said selected distance has been traversed;
(c) calculates and records a frequency per mile parameter for said vehicle; and
(d) utilizes said frequency per mile parameter in said mileage tracking mode;

rendering said trip expense tracking system useful in a variety of vehicles having a variety of differing electrical odometer signals.

5. A trip expense tracking system according to claim 1 wherein said computer program is also selectively operable in a vehicle calibration mode by a vehicle operator during which said computer program:
   (a) prompts the vehicle operator to enter the current vehicle odometer reading at said computer keyboard;
   (b) prompts the vehicle operator to enter the current vehicle odometer reading at said computer keyboard after a selected time interval;
   (c) calculates and records a frequency per mile parameter for said vehicle; and
   (d) utilizes said frequency per mile parameter in said mileage tracking mode;
rendering said trip expense tracking system useful in a variety of vehicles having a variety of differing electrical odometer signals.

6. A trip expense tracking system according to claim 1, wherein said computer program is also selectively operable in:
   (a) a calibration mode during which said computer program monitors said electrical odometer signal a selected time interval to calculate a particular frequency per mile parameter which is unique to said vehicle; and
   (b) an update mode during which an odometer value in said computer program is updated to an actual vehicle odometer value, after a period of non-use of said trip expense tracking system;
wherein said trip expense tracking system is adaptable for use in a plurality of vehicles having differing electrical odometer signals and odometer values, and wherein said trip expense tracking system may be used intermittently in at least one vehicle.

7. A trip expense tracking system according to claim 1, wherein said computer program further includes a trip purpose menu with a plurality of preselected trip purpose options, and a trip contact menu with a plurality of preselected trip contact options, and means for selecting trip purpose options and trip contact options from said menus.

8. A trip expense tracking system according to claim 1, wherein said computer program further includes a trip purpose menu with a plurality of preselected trip purpose options, and means for selecting trip purpose options and trip contact options from said menus, and means for modifying said trip purpose menu and trip contact menu to add, delete, and change menu options.

9. A trip expense tracking system according to claim 1, wherein said computer program further includes an out-of-pocket expense tracking mode which includes a plurality of menus with preselected menu options of recurring types of out-of-pocket expenses, and which prompts an operator to enter at least one out-of-pocket expense figure in a selected out-of-pocket expense type.

10. A trip expense tracking system according to claim 1, wherein said computer program further includes a calendar mode which includes a date menu with a plurality of date options, a time menu with a plurality of time options, a trip purpose menu with a plurality of trip purpose options, and a trip contact menu with a plurality of trip contact options, and means for selecting options from said menus.

11. A trip expense tracking system for use with a portable computer having a computer memory, a computer keyboard, and a display screen, in a vehicle of the type which generates an electrical odometer signal corresponding to distance traveled by said vehicle, comprising:
   a mileage tracking hardware module electrically coupled to said portable computer for receiving said electrical odometer signal from said vehicle and for generating a mileage signal which is readable by said portable computer, including:
      (a) means for receiving said electrical odometer signal corresponding to distance traveled by said vehicle and recording a quantitative indicator of distance traveled; and
      (b) means for receiving and counting interrogating signals from a source external to said mileage tracking hardware module;
      (c) means for communicating a status indication signal from said mileage tracking hardware module to an external target; and
      (d) means for coordinating operation of said (a) means for receiving said electrical odometer signal, (b) said means for receiving and counting, and (c) said means for communicating; and
   a computer program resident in said memory of said portable computer and operable in a mileage tracking mode for generating a mileage signal from intermittent electrical interaction with said mileage tracking hardware module and grouping data of said mileage signal with trip data and for storing the grouped data in said memory of said portable computer; and
   wherein said mileage signal is read from said mileage tracking hardware module by counting ASCII interrogating signals directed from said portable computer to said mileage tracking hardware module.

12. A trip expense tracking system for use with a portable computer having a computer memory, a computer keyboard, and a display screen, in a vehicle of the type which generates an electrical odometer signal corresponding to distance traveled by said vehicle, comprising:
   a mileage tracking hardware module electrically coupled to said portable computer for receiving said electrical odometer signal from said vehicle and for generating a mileage indication which is readable by said portable computer, including:
      (a) means for receiving said electrical odometer signal corresponding to distance traveled by said vehicle and recording a quantitative indicator of distance traveled; and
      (b) means for receiving and counting interrogating signals from a source external to said mileage tracking hardware module;
      (c) means for communicating a status indication signal from said mileage tracking hardware module to an external target; and
      (d) means for coordinating operation of said (a) means for receiving said electrical odometer signal, (b) said means for receiving and counting, and (c) said means for communicating; and
   a computer program resident in said memory of said portable computer and operable in a mileage tracking mode for generating a mileage signal from intermittent electrical interaction with said mileage tracking hardware module and identifying said mileage indication to a selected data block in said memory of said portable computer.

13. A trip expense tracking system according to claim 12, wherein said computer program identifies said mileage indication to a data block which is at least partially generated by entries at said computer keyboard.

14. A trip expense tracking system for use with a portable computer having a computer memory, a computer keyboard, and a display screen, in a vehicle of the type which generates an electrical odometer signal corresponding to distance traveled by said vehicle, comprising:

a mileage tracking hardware module electrically coupled to said portable computer for receiving said electrical odometer signal from said vehicle and for generating a mileage signal which is indicative of distance being traversed by said vehicle, including:

(a) means for receiving said electrical odometer signal corresponding to distance traveled by said vehicle and recording a quantitative indicator of distance traveled; and (b) means for receiving and counting interrogating signals from a source external to said mileage tracking hardware module;

(c) means for communicating a status indication signal from said mileage tracking hardware module to an external target; and (d) means for coordinating operation of said (a) means for receiving said electrical odometer signal, (b) said means for receiving and counting, and (c) said means for communicating; and a computer program resident in said memory of said portable computer and operable in a mileage tracking mode for generating a mileage signal from intermittent electrical interaction with said mileage tracking hardware module and recording it in said memory of said portable computer.

15. A trip expense tracking system for use with a portable computer having a computer memory, a computer keyboard, and a display screen, in a vehicle of the type which generates an electrical odometer signal corresponding to distance traveled by said vehicle, comprising:

(1) a mileage tracking hardware module communicatively coupled to said portable computer for receiving said electrical odometer signal from said vehicle and for generating a mileage signal which is readable by said portable computer, including:

(a) means for receiving a quantitative indicator of distance traveled through intermittent communication with a signal source external to said mileage tracking hardware module;

(b) means for communicating a signal indicative of mileage data from said mileage tracking hardware module to an external target; and (c) means for coordinating operation of said (a) means for receiving and (b) said means for communicating; and (2) a computer program resident in said memory of said portable computer and operable in a mileage tracking mode for receiving data relating to at least one of (a) trip purpose, (b) trip contact, and (c) trip time, and for generating a mileage signal from intermittent communicative interaction with said mileage tracking hardware module and grouping data of said mileage signal with at least one of (a) said trip purpose, (b) trip contact, and (3) trip time data and for storing the grouped data in said memory of said portable computer.

16. A trip expense tracking system according to claim 15, wherein said portable computer includes an expansion slot and said mileage tracking hardware module is carried by said portable computer in said expansion slot.

17. A trip expense tracking system according to claim 15, wherein said mileage tracking hardware module is fixedly mounted in said vehicle and releasably electrically coupled to said portable computer by a cable.

18. A trip expense tracking system according to claim 15, wherein said electrical odometer signal differs in frequency per mile between said vehicle and other vehicles, and wherein said computer program is also selectively operable in a vehicle calibration mode during which said computer program:

(a) prompts the vehicle operator to enter the current vehicle odometer reading at said computer keyboard;

(b) prompts the vehicle operator to drive a selected distance, and depress a selected key of said computer keyboard when said selected distance has been traversed;

(c) calculates and records a frequency per mile parameter for said vehicle; and (d) utilizes said frequency per mile parameter in said mileage tracking mode;

is rendering said trip expense tracking system useful in a variety of vehicles having a variety of differing electrical odometer signals.

19. A trip expense tracking system according to claim 15, wherein said computer program is also selectively operable in:

(a) a calibration mode during which said computer program monitors said electrical odometer signal a selected time interval to calculate a particular frequency per mile parameter which is unique to said vehicle; and (b) an update mode during which an odometer value in said computer program is updated to an actual vehicle odometer value, after a period of non-use of said trip expense tracking system;

wherein said trip expense tracking system is adaptable for use in a plurality of vehicles having differing electrical odometer signals and odometer values, and wherein said trip expense tracking system may be used intermittently in at least one vehicle.

20. A trip expense tracking system according to claim 15, wherein said computer program further includes a trip purpose menu with a plurality of preselected trip purpose options, and a trip contact menu with a plurality of preselected trip contact options, and means for selecting trip purpose options and trip contact options from said menus.

21. A trip expense tracking system according to claim 15, wherein said computer program further includes a trip purpose menu with a plurality of preselected trip purpose options, and means for selecting trip purpose options and trip contact options from said menus, and means for modifying said trip purpose menu and trip contact menu to add, delete, and change menu options.

22. A trip expense tracking system according to claim 15, wherein said computer program further includes an out-of-pocket expense tracking mode which includes a plurality of menus with preselected menu options of recurring types of out-of-pocket expenses, and which prompts an operator to enter at least one out-of-pocket expense figure in a selected out-of-pocket expense type.

23. A trip expense tracking system according to claim 15, wherein said computer program further includes a calendar mode which includes a date menu with a plurality of date options, a time menu with a plurality of time options, a trip purpose menu with a plurality of trip purpose options, and a trip contact menu with a plurality of trip contact options, and means for selecting options from said menus.

* * * * *